(12) United States Patent
Perry

(10) Patent No.: US 9,963,137 B2
(45) Date of Patent: May 8, 2018

(54) MACHINE FOR AUGMENTATION, STORAGE, AND CONSERVATION OF VEHICLE MOTIVE ENERGY

(71) Applicant: Charles Hampton Perry, Murfreesboro, TN (US)

(72) Inventor: Charles Hampton Perry, Murfreesboro, TN (US)

(*) Notice: Subject to any disclaimer, the term of this patent is extended or adjusted under 35 U.S.C. 154(b) by 0 days. days.

(21) Appl. No.: 15/044,820

(22) Filed: Feb. 16, 2016

(65) Prior Publication Data

US 2016/0248300 A1    Aug. 25, 2016

Related U.S. Application Data

(63) Continuation of application No. 14/253,073, filed on Apr. 15, 2014, now Pat. No. 9,260,005.

(51) Int. Cl.
| | |
|---|---|
| *B60W 20/00* | (2016.01) |
| *B60K 6/42* | (2007.10) |
| *B60K 6/48* | (2007.10) |
| *B60K 7/00* | (2006.01) |
| *H02K 7/00* | (2006.01) |
| *H02K 15/03* | (2006.01) |
| *B60L 11/14* | (2006.01) |
| *B60L 15/20* | (2006.01) |
| *H02K 1/27* | (2006.01) |
| *H02K 7/14* | (2006.01) |
| *H02K 7/18* | (2006.01) |

(Continued)

(52) U.S. Cl.
CPC ............... *B60W 20/00* (2013.01); *B60K 6/42* (2013.01); *B60K 6/48* (2013.01); *B60K 7/0007* (2013.01); *B60L 11/14* (2013.01); *B60L 15/20* (2013.01); *H02K 1/27* (2013.01); *H02K 1/2793* (2013.01); *H02K 7/006* (2013.01); *H02K 7/14* (2013.01); *H02K 7/1846* (2013.01); *H02K 15/03* (2013.01); *H02K 15/14* (2013.01); *H02K 21/24* (2013.01); *B60K 2007/0092* (2013.01); *B60L 2200/46* (2013.01); *B60L 2220/44* (2013.01); *B60L 2220/50* (2013.01); *B60L 2240/421* (2013.01); *B60L 2240/423* (2013.01); *B60L 2240/441* (2013.01); *B60L 2240/443* (2013.01); *Y02T 10/6221* (2013.01); *Y02T 10/641* (2013.01); *Y02T 10/645* (2013.01); *Y02T 10/70* (2013.01); *Y02T 10/7077* (2013.01); *Y02T 10/7275* (2013.01); *Y10S 903/902* (2013.01); *Y10T 29/49012* (2015.01)

(58) Field of Classification Search
USPC ................ 701/22; 310/67 R; 180/65.51
See application file for complete search history.

(56) References Cited

U.S. PATENT DOCUMENTS 4,075,603 A * 2/1978 Snyder ................ B60C 23/041
                                                    200/61.25
4,389,586 A * 6/1983 Foster ................. B60K 7/0007
                                                    310/67 R (Continued)

*Primary Examiner* — Tyler D Paige
(74) *Attorney, Agent, or Firm* — Wayne Edward Ramage; Baker Donelson

(57) ABSTRACT

A device for addition of motive force to a vehicle, with rotor-plate, rotor-arms, rotor permanent magnets, stator-plate, stator columns, stator electromagnets, and battery, cell, or other energy storage device. The device is retrofittable on existing wheel assemblies, and installation coverts an internal combustion vehicle to a hybrid with electric propulsion.

14 Claims, 37 Drawing Sheets

(51) Int. Cl.
*H02K 15/14* (2006.01)
*H02K 21/24* (2006.01)

(56) References Cited

U.S. PATENT DOCUMENTS

| | | | | |
|---|---|---|---|---|
| 5,584,902 | A * | 12/1996 | Hartig | C03C 17/36 204/192.26 |
| 6,355,996 | B1 * | 3/2002 | Birkestrand | B60L 11/1807 180/65.51 |
| 6,492,756 | B1 * | 12/2002 | Maslov | B62M 6/45 310/156.12 |
| 6,836,035 | B1 * | 12/2004 | Pawletko | B60L 7/22 180/65.51 |
| 7,552,787 | B1 * | 6/2009 | Williams | B60K 6/105 180/65.51 |
| 7,624,830 | B1 * | 12/2009 | Williams | B60K 6/105 180/165 |
| 8,700,239 | B2 * | 4/2014 | Perry | B60K 6/48 180/165 |
| 9,260,005 | B2 * | 2/2016 | Perry | B60K 6/48 |
| 2003/0193263 | A1 * | 10/2003 | Maslov | B62M 6/40 310/254.1 |
| 2003/0193265 | A1 * | 10/2003 | Maslov | H02K 1/187 310/254.1 |
| 2004/0212259 | A1 * | 10/2004 | Gould | H02K 7/14 310/67 R |
| 2005/0104469 | A1 * | 5/2005 | Zepp | H02K 7/12 310/191 |
| 2005/0174106 | A1 * | 8/2005 | Inoue | F16C 19/184 324/164 |
| 2006/0075833 | A1 * | 4/2006 | Koyagi | B60B 27/00 73/862.541 |
| 2006/0087315 | A1 * | 4/2006 | Inoue | G01D 5/2086 324/207.25 |
| 2006/0279155 | A1 * | 12/2006 | Holtzapple | F01C 1/10 310/168 |
| 2008/0066980 | A1 * | 3/2008 | James | B60K 7/0007 180/65.51 |
| 2008/0078631 | A1 * | 4/2008 | Erlston | H02K 7/102 188/159 |
| 2008/0169140 | A1 * | 7/2008 | Perry | B60K 7/0007 180/65.51 |
| 2008/0257620 | A1 * | 10/2008 | Poulsen | B60K 6/26 180/65.51 |
| 2009/0108712 | A1 * | 4/2009 | Holtzapple | H02K 21/125 310/216.004 |
| 2009/0167104 | A1 * | 7/2009 | Dunn | H02K 16/00 310/198 |
| 2010/0138127 | A1 * | 6/2010 | Boughtwood | B60L 7/006 701/71 |
| 2010/0211241 | A1 * | 8/2010 | Goodwin | B60L 3/0046 701/22 |
| 2011/0101901 | A1 * | 5/2011 | Zhu | H02K 16/00 318/400.14 |
| 2011/0224043 | A1 * | 9/2011 | Bachmann | B60K 6/26 475/149 |
| 2011/0238249 | A1 * | 9/2011 | Ananthakrishna | B60L 11/14 701/22 |
| 2012/0116621 | A1 * | 5/2012 | So | B60B 19/00 701/22 |
| 2012/0215389 | A1 * | 8/2012 | Perry | B60K 6/48 701/22 |
| 2012/0319514 | A1 * | 12/2012 | Iwase | B60K 6/40 310/78 |

* cited by examiner

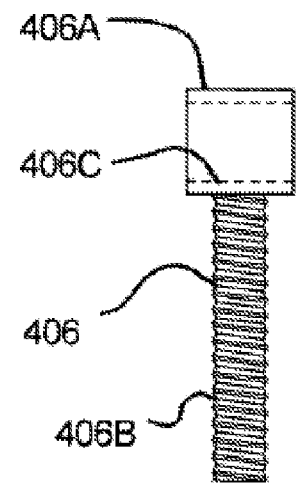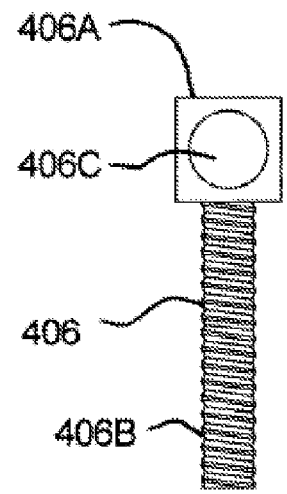
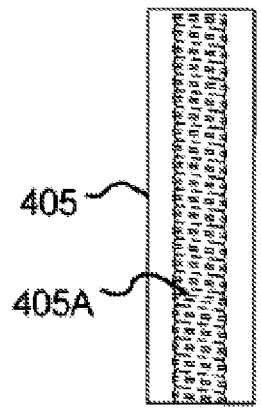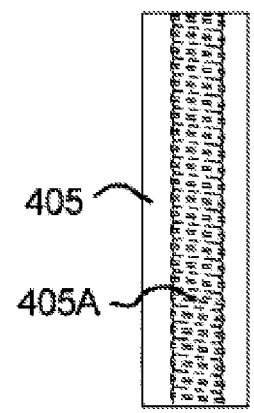
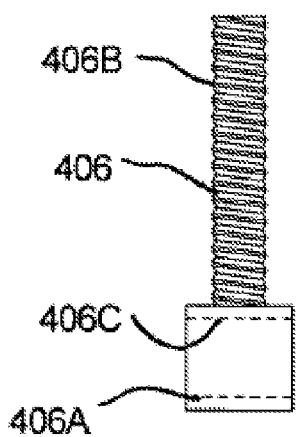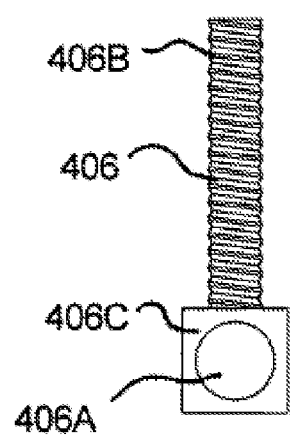
FIG. 31A  FIG. 31B

MACHINE FOR AUGMENTATION, STORAGE, AND CONSERVATION OF VEHICLE MOTIVE ENERGY

This application is a continuation of U.S. patent application Ser. No. 14/253,073, filed Apr. 15, 2014, which is a continuation of U.S. patent application Ser. No. 12/932,312, filed Feb. 23, 2011, which is a continuation-in-part application of U.S. patent application Ser. No. 12/008,415, filed by Charles Hampton Perry on Jan. 10, 2008, which claims priority to U.S. Provisional Application No. 60/880,373, filed on Jan. 11, 2007, and is entitled to those filing dates for priority in whole or in part. The specification, figures and complete disclosure of U.S. Provisional Application No. 60/880,373 and U.S. patent application Ser. Nos. 12/932,312 and 12/008,415 and 14/253,073 are incorporated herein by specific reference for all purposes.

FIELD OF INVENTION

This invention relates generally to the field of hybrid internal combustion-electric powered vehicles, and more specifically to machine for augmentation, storage, and conservation of vehicle motive energy.

BACKGROUND OF THE INVENTION

In the instant specification and claims, the process of installing or including electrical energy augmentation of an internal combustion powered vehicle is referred to as "hybridization". Vehicles thusly augmented will be referred to as "hybridized." Further, in the instant specification and claims, the terms "modify," "sophistication," and forms thereof exclude such simple and inexpensive processes as drilling holes in extant elements merely to provide anchor points to interface components or to bracket or attach elements to extant components or to run wires. Where used, the term "conventional" indicates an internal combustion engine or vehicle driven thereby.

In this document, the term "motor-generator" is used to describe a transducer that can function as either an electric motor or a generator, converting electrical power to or from mechanical power, the term transducer describing any device that converts one type of energy to another type of energy.

It has long been known that internal combustion engines operate most efficiently within a narrow range of powers or speeds. However, in normal use, an automobile must climb and descend hills, stop and start, accelerate and brake, or cruise at high speeds on highways. These impose a wide range of power and speed demands on the power plant.

Thus, the internal combustion engine powering such a vehicle often will not be operating within its most efficient parameters. In fact, in the severe stop-and-go situations in which most driving is accomplished, its efficiency is generally quite low. Therefore, alternate drive systems and power sources to increase efficiency are increasingly sought.

One such effective system, popularly known as a "hybrid," involves combining an electric motor with an internal combustion engine in such a manner as to allow back-and-forth power augmentation and trade-off, permitting the more efficient and effective of the two to provide propulsion within its best operating range as speed and power demands are made and relaxed. This permits, for example, the electric motor to augment the internal combustion engine to prevent it from having to operate above its preferred power level. In example, when the vehicle must accelerate from a stop to particular speed, the electric motor, which characteristically provides high torque, even at low speeds, is engaged to such degree that the internal combustion engine need not exceed its optimal power output. Also, while at cruise speeds, when acceleration is required, the internal combustion engine may continue to run at its preferred power level while the electric motor adds the required extra power.

The hybrid may also comprise means to convert the electric motor to an electric energy generator when the vehicle is braking or traveling downhill. Employed thus, momentum of the vehicle, and, indirectly, energy from the internal combustion engine, may be used to recharge the battery, cell, or other energy storage device, thereby literally recycling energy that would otherwise be lost. The hybrid may also have a means to recharge the battery, cell, or other energy storage device by plugging it into an electric power grid. Most recharging could be done at night, during non-peak power demand hours thusly using cheaper, low demand electricity.

In addition, many other benefits, both economic and ecological, well known to those well versed in the art, may accrue due to hybridization of motor vehicles. However, up until now, the high cost to end users of implementing this art has prevented wide scale adoption. Typically, a hybrid vehicle is designed and manufactured, as a new vehicle from the very beginning, because its manufacture requires inclusion of additional elements. Because the traditional elements of exclusively internal combustion vehicles configurations must be redesigned and specially manufactured to accommodate the additional hybridizing elements, economy of scale may not be achieved.

Further, even if a new hybrid vehicle could be brought to end users at a competitive price, market penetration would be very slow due to the hundreds of millions of conventional vehicles already on the road world-wide, the abandonment of which could not be effected without serious economic disadvantage.

With this in mind, various previous technologies have been proposed to convert extant gasoline powered vehicles to hybrid electrical units. The envisioned solutions typically require placement of one or more electric motors in mechanical communication with the wheels of a given vehicle. These motors are generally tied to an electrical storage battery and a controller similar to the one used in new design-built hybrid vehicles. Such solutions, however, continue to pose significant cost obstacles. The greatest challenge they present is to design an affordable and efficient method for installing the electric motor drive without also re-designing and replacing vast numbers of components already in use.

Typically, the proposed means of meeting this challenge requires replacement or substantial modification of the existing wheel structure, including the wheel bearings and brakes. Because of this replacement, other engineering issues and obstacles arise, such as the location, design and coordination of the electric motors as well as the addition of significant un-sprung (and therefore, excess) weight to the suspension system. These expenses multiply quickly and become cost prohibitive.

SUMMARY OF INVENTION

The invention taught herein provides means of avoiding this expense, thereby bringing the costs within economically viable parameters. Conversion of present internal combustion powered automobiles to internal combustion/electric hybrids becomes a practical option. Disclosed herein is a wheel hub motor technology to power vehicles of two, three, or four-wheeled design. In the preferred embodiment, the wheel hub motor is integrated into the structure of existing axle/hub/spindle/brake assemblies. Where previous technologies predominantly employ wheel hub and electric motor configurations that require significant modification and re-design of the associated wheel and hub assemblies to incorporate components such as bearings, axle, and brakes, the herein taught art exploits the existing axle, bearings, brake structure of the associated vehicle, adding the wheel hub motor capability essentially without modifying the existing wheel structure.

The advantages of this approach include: lower cost, simplicity of retrofit, and maintenance simplicity on the electric motor and on the existing brake, bearings and wheel structure. The retrofit addition of easily integrated hybrid components such as battery pack, control electronics, electric motor, and wiring allows "plug-and-go" hybrid conversion for most automobiles.

Preferred embodiments incorporate a rotor and stator. These are constructed of corrosion resistant materials that prevent exposure to normal operating conditions from degrading performance. Reliability of vehicle bearings and brakes is unaffected by the addition of this wheel-hub motor stator and rotor. This wheel hub motor system presents conveniently few obstacles to routine conventional maintenance requirements. For example, when maintenance to the rear brake assembly is required, the tire/wheel is removed in the normal manner and the rotor is similarly removed from the lug-bolts. Since the stator-plate is located behind the brake spindle assembly, it does not affect the repair procedure.

The rotor and stator assemblies are mechanically simple components that could be produced at low cost in high volume production. System and installation expenses are also avoided because the load bearing and braking function of the wheel as designed by the automotive designer is not changed. Thus this invention largely overcomes the challenge of adding electric motor hybrid power to an existing vehicle without extensive mechanical modification and without significant negative impact on cost, performance, reliability, or maintenance.

Generally speaking, the specified brushless direct current or DC motor design employed offers several advantages. A brushless motor normally has permanent magnets which rotate and a stationary electromagnet. This eliminates significant difficulties that would otherwise result from the necessity of connecting current (via a brush/commutator) to a moving armature. An electronic controller replaces, and performs the same function as, a brush/commutator in a brushed DC motor. This function is the activation of continuous phase switching in the windings, thus keeping the motor in motion.

Other advantages are that brushless DC motors generally offer more torque per unit of weight, improved efficiency and reliability, low maintenance requirements, reduced noise, longer lifetime (largely due to the existence of no brush/commutator to wear out), elimination of brush/commutator sparks, and, accordingly, less overall electromagnetic interference (EMI). Finally, brushless DC motors characteristically exhibit particularly high efficiency in conversion of electricity into mechanical power, particularly under low-load conditions.

A challenge posed in brushless motor design is the fact that a controller must direct and/or detect rotation of the rotor. This requires a means of determining the rotor's orientation/position relative to the stator coils. Known technologies may use Hall effect sensors or encoders to directly measure the rotor's position. Such technologies are well established, and therefore require no other specific details herein.

Other methods measure electromotive force in the undriven coils to infer the rotor position, thereby eliminating any need for separate Hall effect sensors. Such systems are often called, although somewhat erroneously, sensorless controllers. Such sensorless controllers may face difficulties in starting from a full-stop condition, because with no motion, there is no electromotive force to be measured in the undriven coils.

In any case, the controller, employing a logic circuit, regulates high-current DC power. In a more primitive form, a controller may employ comparators to merely determine when, to advance an output phase. More technically sophisticated controllers may exploit a microcontroller to manage acceleration, to precisely control speed and to fine-tune efficiency.

One mention-worthy potential disadvantage in some brushless designs is that, although the maximum electrical power that can be applied to a brushless DC motor is notably high, it can be subject to significant thermal limitations. Heat, particularly in the case of rare earth magnets, can quickly cause permanent degradation of magnetic qualities. This can pose notable cooling demands.

Inherently in the design of the technology taught herein, this challenge is largely overcome. High volumes of cooling air constantly pass through the device while its associated vehicle is in motion. Thus, copious heat exchange is naturally available to drain off thermal energy. As a rule of thumb, the more power demanded, the more speed is initially produced, and the more cooling air is forced through as a result of the increased speed. Once cruise speed is reached, power demands reduce, but cooling air-flow continues at a high rate.

To direct the description with greater specificity and to address and compare earlier technologies, U.S. Pat. No. 4,165,795 by Lynch et al. and U.S. Pat. No. 4,335,429 by Kawakatsu, both of which are incorporated herein by specific reference, disclose hybrid drive systems for automobiles wherein an internal combustion engine is augmented by a battery powered electric motor. Both patents teach electric motors and internal combustion engines communicating with common drive shafts. In addition, the electric motors taught by Lynch et al., and Kawakatsu comprise housings, shafts, armatures, and bearings intrinsic to said motors.

In contrast to Lynch et al. and Kawakatsu, the instant art teaches an electric motor fitted on and within an internal combustion powered automobile but not in physical communication with the drive shaft served by the internal combustion engine. The instant art, instead, exploits other non-modified elements normally present in an internal combustion powered vehicle, using these elements to mount or serve as armature, shaft, housing, and bearings. In further contrast, the instant art teaches a stator and a rotor being held in operative magnetic communication with each other by connective devices which also hold in operable position un-modified original components of an internal combustion vehicle. Thus, the stator and rotor may be added or removed essentially without displacing or otherwise affecting the vehicle's conventional drive system.

U.S. Pat. No. 4,714,854 by Oudet and the monograph, Optimal Design and Control of Axial-Flux Brushless DC Wheel-motor For Electric Vehicles, by Y. P. Yang et al., which are incorporated herein by specific reference, teach electric motors suitable for hybrid electric and internal combustion powered vehicles. Said motors comprise armatures, shafts, housings, and bearings normally intrinsic to such motors. Thus, these motors may function independently of any other elements of an associated vehicle.

In contrast to Oudet and Yang et al., the instant art exploits non-modified elements normally present in an internal combustion engine powered vehicle to mount, contain, or serve as portions of armature(s), shaft(s), housing(s), and bearings. In further contrast, the instant art teaches a stator and a rotor being held in operative magnetic communication by connective devices which also hold in operable communication un-modified elements normally included in or comprising a conventional vehicle. Because the instant art incorporates components of an associated vehicle, it may not function independently of the associated vehicle. However, the instant art may be installed on, or removed from a vehicle without requiring replacement parts for, or affecting or disabling the vehicle on which it is or was installed. Simply by disengaging the connective devices and mounts, the elements may be disassociated from the vehicle and the rotor and/or stator may be disassociated from each other. In fact, by simply disconnecting electrical circuits, the associated vehicle may return to function in a purely internal combustion mode, the electrical components remaining in place.

U.S. Pat. No. 5,438,228 by Couture et al.; U.S. Pat. No. 5,600,191 by Yang; U.S. Pat. No. 6,768,932 B2 by Claypole et al.; U.S. Pat. No. 2,514,460 by Tucker; and U.S. Pat. No. 5,157,295 by Stefansky et al., all of which are incorporated herein by reference, disclose in-hub wheel-motors that require specially designed hub elements to support the in-hub wheel-motors and to transfer force from the in-hub motors to the wheels.

In contrast to Couture et al., Yang, Claypole et al., Tucker, and Stefansky, the instant art requires no specially designed or modified vehicle elements to communicate force from a motor to a wheel. Instead it communicates with the un-modified wheel and wheel support elements normally present in a conventional vehicle.

Accordingly, a primary object of the invention is to provide low cost addition of electric power augmentation to an internal combustion engine powered vehicle while requiring little or no modification of existing vehicle components. Other objects and advantages of the present invention will become apparent from the following descriptions, taken in connection with the accompanying drawings, wherein, by way of illustration and example, an embodiment of the present invention is disclosed. In accordance with a preferred embodiment of the invention, there is disclosed a retro-fittable apparatus for adding electrical motive force to a vehicle using a brushless DC motor, control logic, and electrical energy storage device.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 31A is a side view of mounting hardware.
FIG. 31B is a side view of mounting hardware.

LIST OF NUMBERED COMPONENTS

Figure 1:
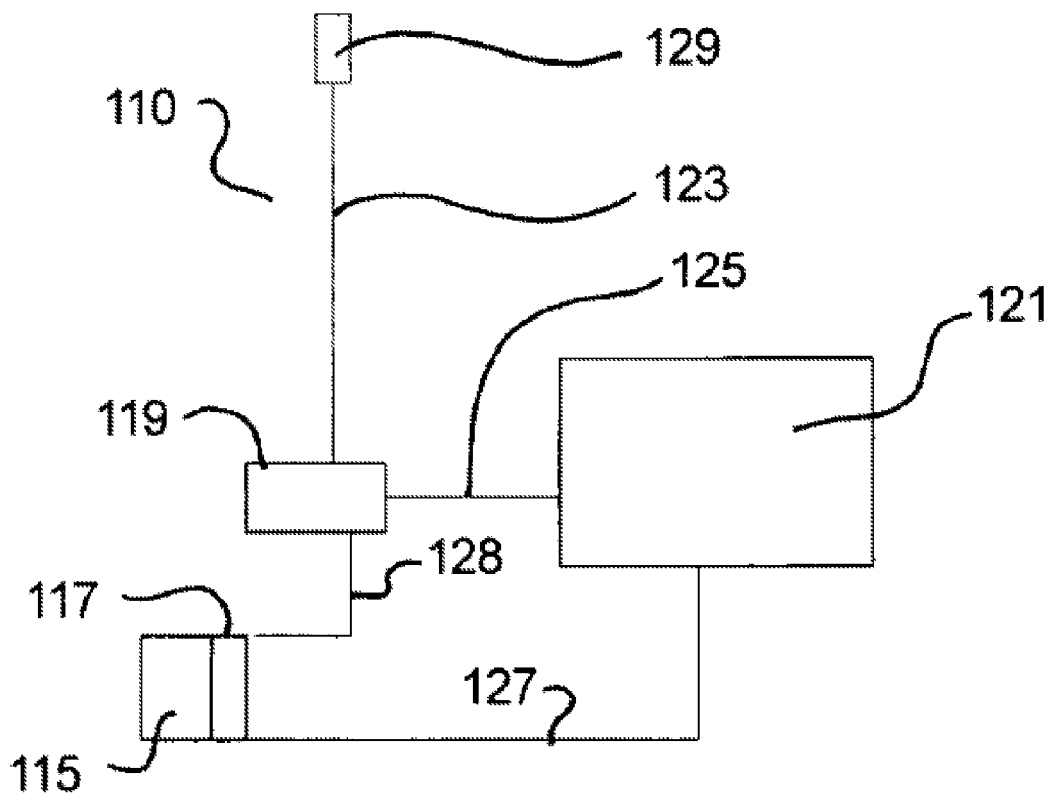
FIG. 1 is a schematic of a typical electric drive system.

110 Electric drive system
115 Electric motor
117 Sensor-module
119 Logic/control module
121 Battery, cell, or other energy storage device
123 Interface of engine-load-level-sensor and logic/control module
125 Interface of logic/control module and battery, cell, or other energy storage device
127 Interface of battery, cell, or other energy storage device, and electric motor
128 Interface of electric motor and logic/control module
129 Engine-load-level-sensor
131 Non-movable axle support
133 Drive-Axle
134 Spindle Assembly
135 Non-rotating hub-portion
137 Rotating hub-portion
139 Stud-bolts
140 Lug nut
141 Rotor-plate
142 Rotor-plate central void
143 Rotor-plate holes
144 Rotor-arm
145 Rotor permanent magnet
147 Hub-bolt
149 Non-movable hub-plate
151 Electromagnet
153 Slot
155 Stator-plate
157 Stator-plate hole
159 Stator-arm
161 Stator-ring
163 Hub-mounted wheel-motor
165 Wheel-support-hub or drum
167 Rotor
169 Stator
175 Stator-plate central void
177 Stator-ring aperture
179 Plate-mounted-support pin
181 Tire
183 Wheel-rim and hub
190 Electric motor
192 Lug-bolt hole
201 Stator
202 Stator wound with electric motor wire
209 Stator-poles
211 Typical drum
212 Ferromagnetic ring
212A Magnets
212B Exterior surfaces of the permanent magnets
214 Drum exterior periphery
301 Stator
304 Magnets
304A Surfaces of each magnet
308 Un-modified brake rotor/disk
308A Reverse side of rotor
308B Obverse side of rotor
309A Electromagnets
309 Stator-poles
312 Permanent magnets
313 Caliper
314 Disc-pads
320 Magnet mounting-holes
321 Edges of magnet mounting-holes
322 Chamfer
330 Stator electromagnets
401 Stator
402 Backing-plate
403 Lower control-arm spindle
404 Magnets
405 Mounting-hardware-adjusting-sleeve
405A Mounting-hardware-adjusting-sleeve threaded bore
406 Mounting-head-bolt
406A Mounting-head-bolt head
406B Mounting-head-bolt threads
406C Mounting-head-bolt threaded bore
407 Gap-adjusting-bolt having threads
407A Connective bolt having threads
407B Shim or washer
408 Slip-on rotor
409 Stator-poles
410 Wheel-mounting-studs
410A Mounting-holes
411 Brake-drum
412 Magnetic-flux-ferromagnetic-ring
413 Magnet-holding-ring
414 Backing-plate axle hole
415 Brake-drum rotatable element
416 Brake-drum stationary element
420 Magnet-mounting-hole

DETAILED DESCRIPTION OF EXEMPLARY EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Those well versed in the art will readily recognize that various electric powered drive systems are well known and that vehicles comprising an internal combustion engine with augmentation by such an electric powered drive system are also well known and are commonly referred to as "hybrids." The beneficial effects of hybridization, economic and ecological, real and theoretical, and realized and potential, are also well known. Further, the basic principles of operation, modes of operation, and methods of operation, of all the components of hybridized vehicles, both individually and as they are interfaced and integrated into a functional unit, are well known. Therefore, these particular aspects of the instant art are not, herein, recounted in rigorous detail.

It is well known that electric motors conventionally comprise a magnetized stationary element, the stator, and a magnetized rotating element, the rotor, with means to vary the polarity of said magnetism so that the attraction and/or repulsion of the magnetic poles of said magnets can be coordinated to cause the or rotor to rotate thus providing harnesable mechanical energy. It is also well known that if one of the magnetic elements is an electromagnet having wire coils, said elements may be coordinated to convert mechanical energy to electrical energy rather than to convert electrical energy to mechanical energy.

As is well known, communication between rotating wheels and a motor vehicle essentially universally involves a hub structure having a rotating part and a stationary part. Said hub structure may be referred to as a drum portion or element and may house a braking system, thus the said rotating part may comprise a brake drum and may be referred to as a brake drum. The hub structure also will generally comprise some arrangements of bearings.

The stationary part of the hub communicates with a stationary element extending from the vehicle frame, either a separate structure, such as an axle support or lower control-arm spindle or an integral extension of the frame itself. The hub structure is then fixed to said stationary element so that a wheel may be fixed to the hub structure rotating element. If the wheel is propulsion driven, the hub structure will also comprise an element, often an axle, which transfers rotary force from the drive train to the rotating hub element and to the wheel. If the wheel is driven, the stationary element extending from the vehicle frame is generally a non-movable axle support for the rotating axle which is generally journaled therein. The whole of the wheel-vehicle communication structure may be referred to as a hub or spindle assembly.

Such structures and communications are known and understood by those well versed in the art; therefore, they are not, herein, described in detail. Neither do the drawing figures depict any particular existing structure and/or communication, but will depict elements having features and operating principles common to existing elements and which could function in the manner of existing elements.

The instant art provides installable elements which may communicate with factory installed elements of a conventional, internal combustion-driven motor vehicle. The installable elements include an electric hub-mounted wheel-motor or hub-mounted electric power generator, said communication not interfering with the function of any previously factory-installed elements. These elements are removable. Selected embodiments require no modification, alteration, or sophistication of any motor vehicle factory installed element. Other embodiments have instant art elements and conventional, factory-installed elements integrally combined.

The word "rotor" is a term of art commonly used to refer to the movable part of an electric motor, and also to the disc portion of an automobile disc and caliper type brake system. As the term is employed in the instant specification and claims, the appropriate definition will be obvious from the context. Additional terms and separate component numbers added to distinguish the proper meaning should be evident.

Figure 14:
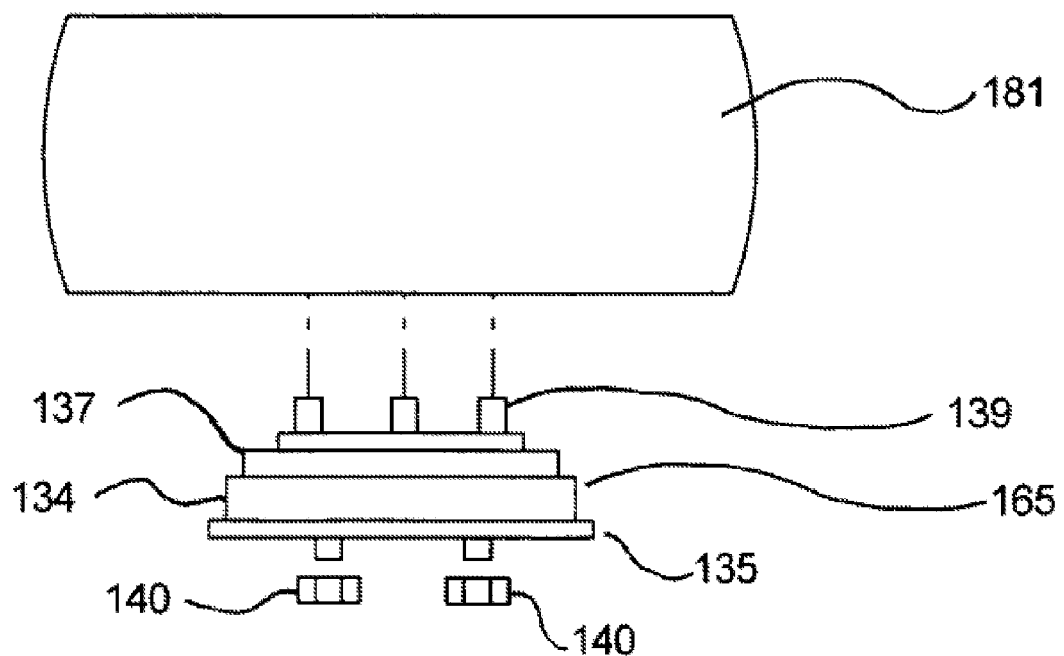
FIG. 14 is a side exploded view of the manner of mounting the hub-mounted wheel-motor, with tire.
Figure 15:
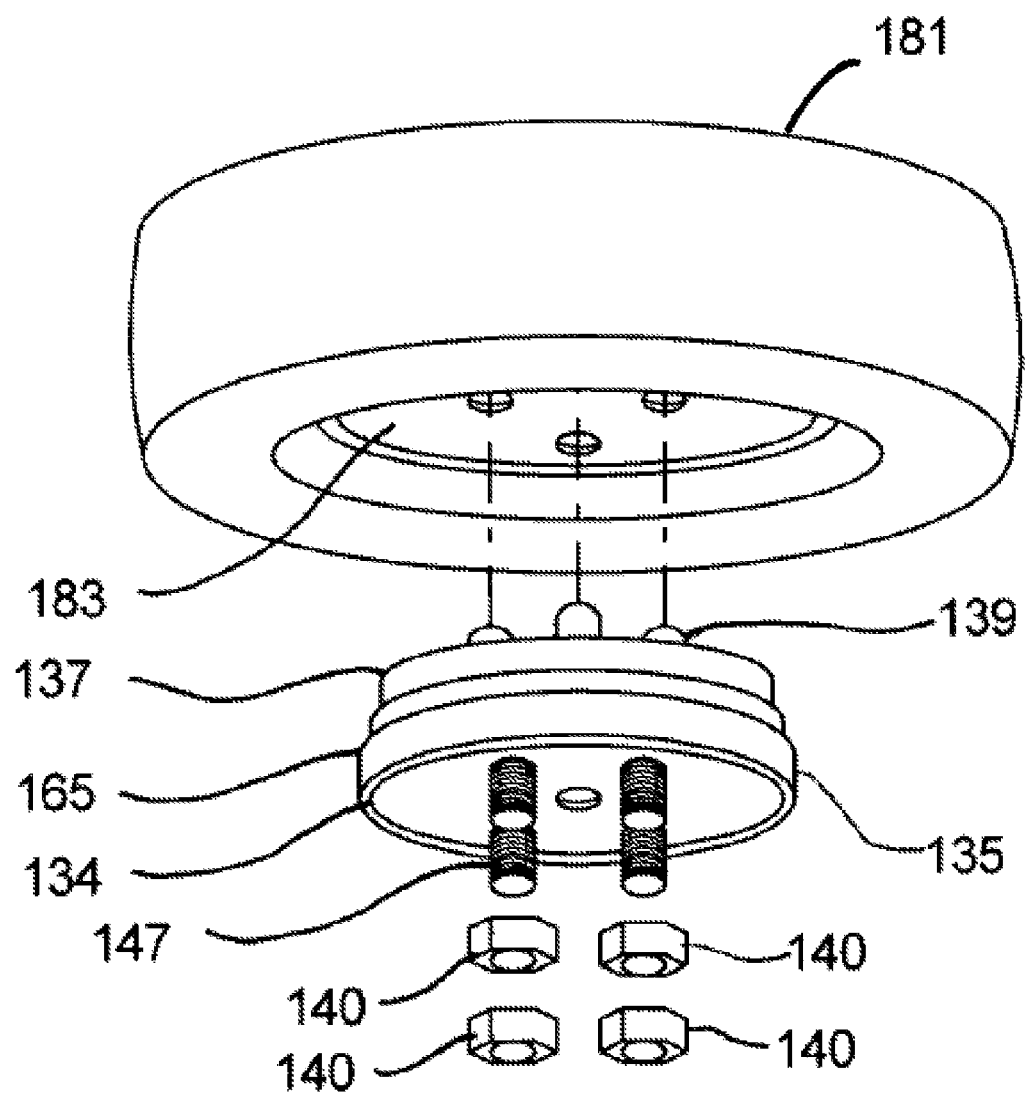
FIG. 15 is a ¾ exploded view of the manner of mounting the hub-mounted wheel-motor, with tire.

First undertaking a broad overview to establish conceptual understanding of the herein taught invention, we refer to FIGS. 14 and 15 that can be used in generic reference to illustrate wheel components as most commonly fitted to the wheel of an automobile or small truck. If the vehicle wheel is originally manufactured to be free-rotating, and not axle-driven, the wheel is mounted on a spindle assembly (134) comprised of a spindle/drum (165), having a rotating portion (137), a non-rotating portion (135), and associated mounting bolts (147). The spindle assembly (134) is mounted directly to the vehicle frame or, as in FIG. 40, a stationary connective element such as a lower control arm spindle (403).

Figure 2A:
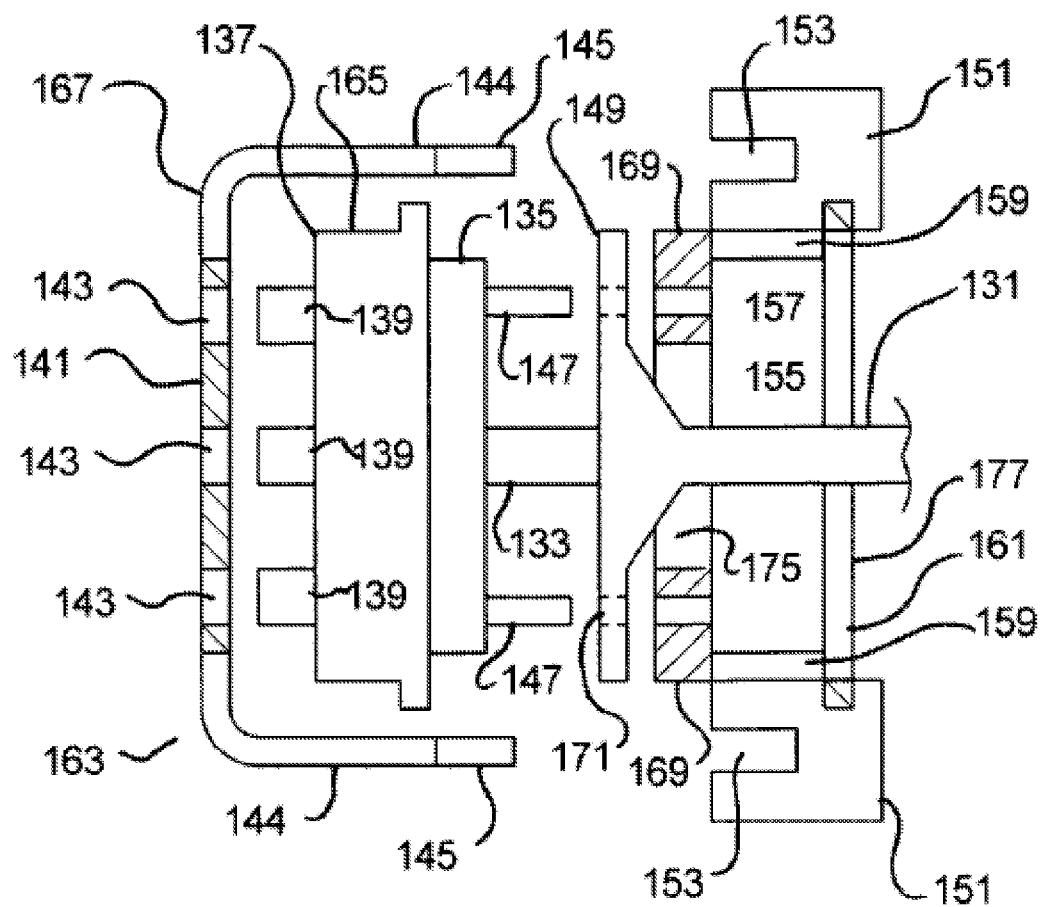
FIG. 2A is an exploded side view of a hub-mounted wheel-motor with some parts in cross-section.

Referring to FIG. 2A, if the vehicle wheel is conventionally axle-driven, a rotating drive-axle (133) having a non-movable axle support (131) extends from the differential to the wheel. Here, the viewer can see the fixed axle housing or support (131) having a rotating drive-axle (133) extending there-through to communicate with the rotating hub-portion (137). The housing or support (131) is also seen to comprise a non-movable hub-plate (149) to which the non-rotating hub-portion (135) may be attached.

In FIGS. 14 and 15, the spindle assembly (134) is shown with drum brakes housed therein. However, if disk brakes are employed, the same physical principles apply, for with either type of braking system, a cylindrical volume is occupied by the rotating spindle assembly (134) which is central to much of the herein taught art. The wheel/tire (181) is attached to the spindle assembly (134) using the stud-bolts (139) extending from the spindle assembly (134). Lug nuts (140) secure them.

Figure 9:
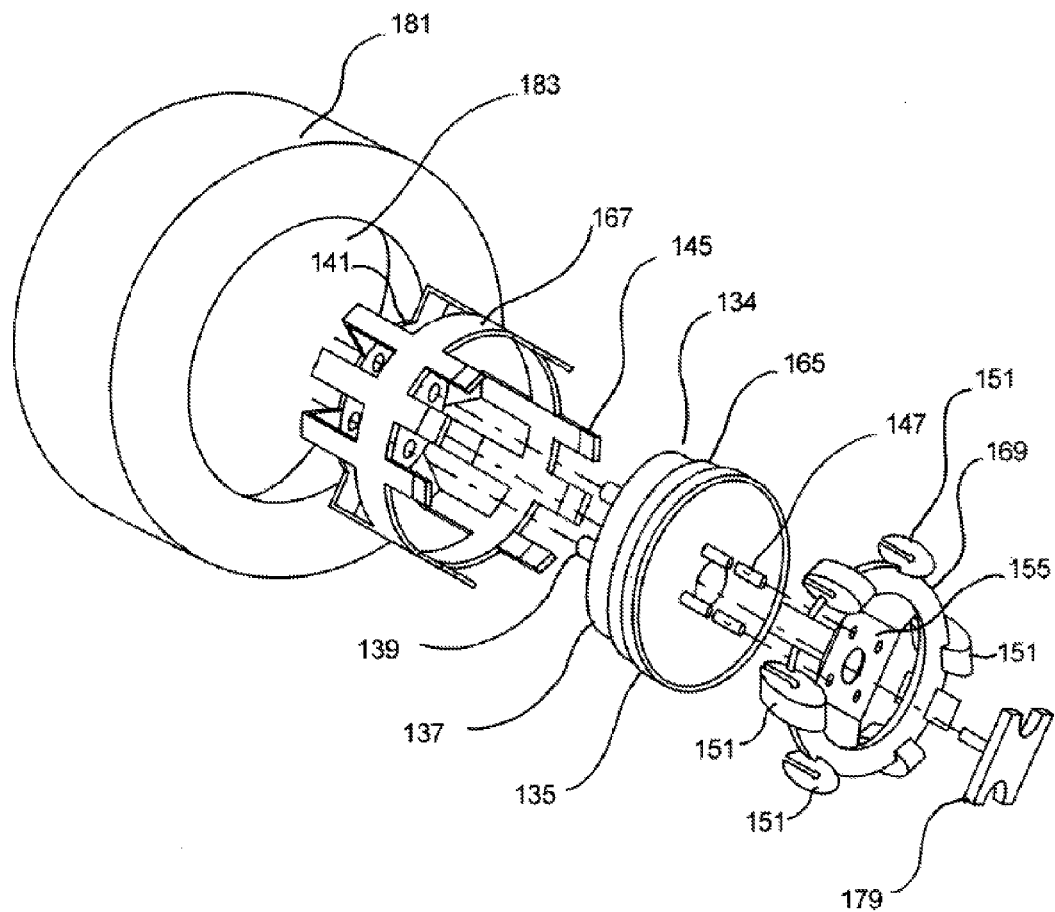
FIG. 9 is an exploded ¾ view of an alternate embodiment of the hub-mounted wheel-motor.
Figure 10:
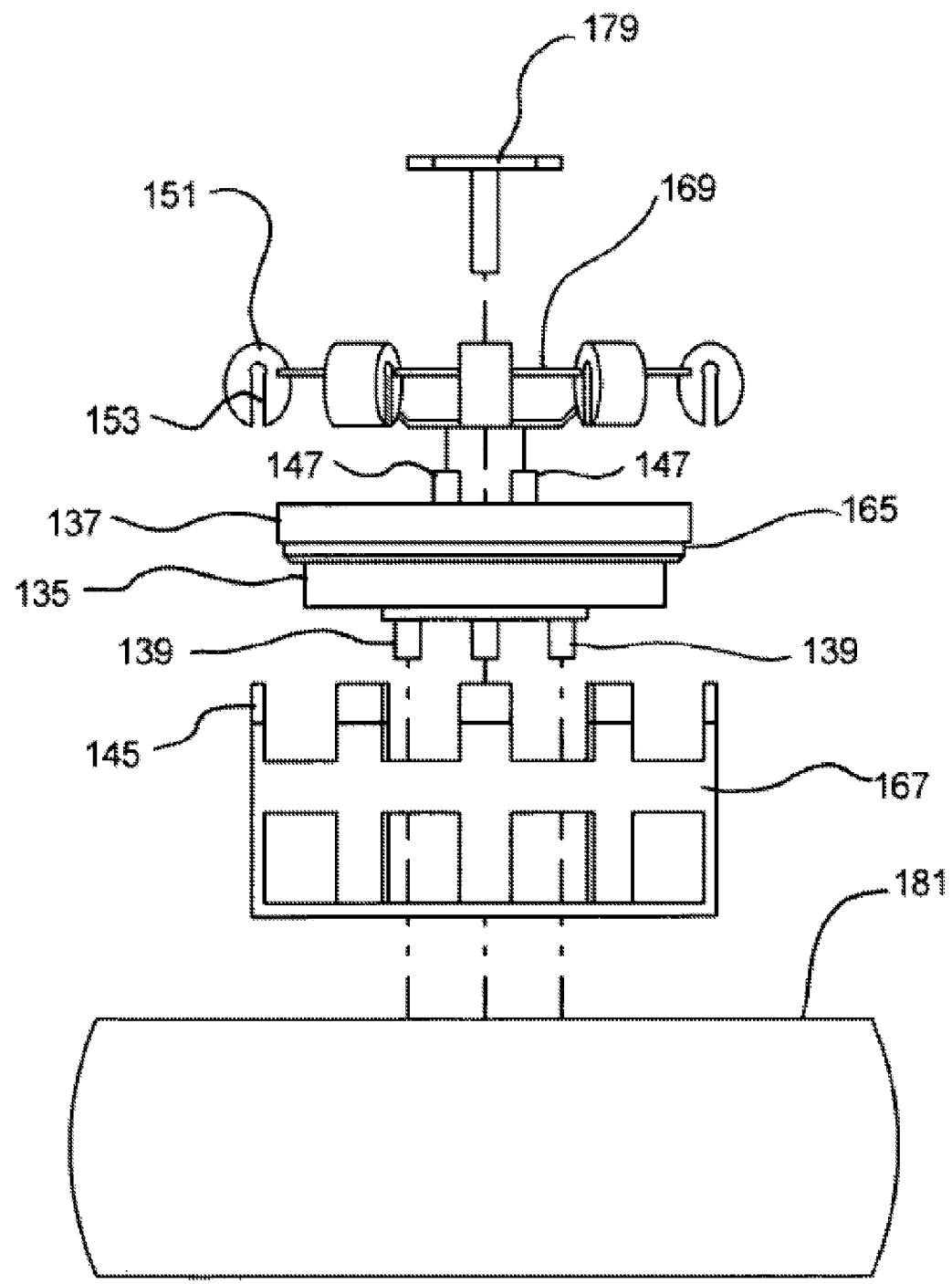
FIG. 10 is an exploded side view of an embodiment of the hub-mounted wheel-motor.

Continuing in broad overview, FIG. 9 shows a tire/wheel (181), spindle assembly (134) and plate-mounted-support pin (179), along with a rotor-plate (141) comprising a rotor (167), and a stator-plate (155) having a stator (169). The rotor (167) and stator (169) together form a DC brushless motor, integrated with the existing spindle assembly (134). The stator-plate (169) is mounted between the spindle assembly (134) and plate-mounted-support pin (179), and is held in place by the illustrated four mounting bolts/nuts (147).

The stator-plate (155), used for mounting the stator assembly does not affect the mechanical integrity of the suspension components. The rotor-plate (141) mounts on the stud-bolts (139) of the rotating hub-portion (137) and the tire/wheel assembly (181) is slid onto spindle assembly (134). Then, the lug nuts (not shown) are tightened in the usual manner. The only dimensional effect of the installation is that the wheel track width is widened slightly. The thickness of the rotor-plate (141) and the stator-plate (155) minimally increases the total wheel track width due to the addition of additional layers between the tire (181) and the vehicle frame. The increase is normally well within manufacturer tolerances.

Although C-shaped magnets (151) that appear frequently in the herein taught technology are presented as preferably ferromagnetic, non-ferromagnetic materials can also be used. Non-ferromagnetic material can provide an advantage in that, if the C-shaped (151) magnets are non-ferromagnetic there is little or no residual magnetic interaction between permanent magnets (145) and the C-shaped magnets (151) when the motor is not in operation. This minimizes unnecessary load on the primary internal combustion engine when the hybrid system is not in use, for instance when the hybrid batteries have reached a low charge state or the system is turned off.

Figure 12:
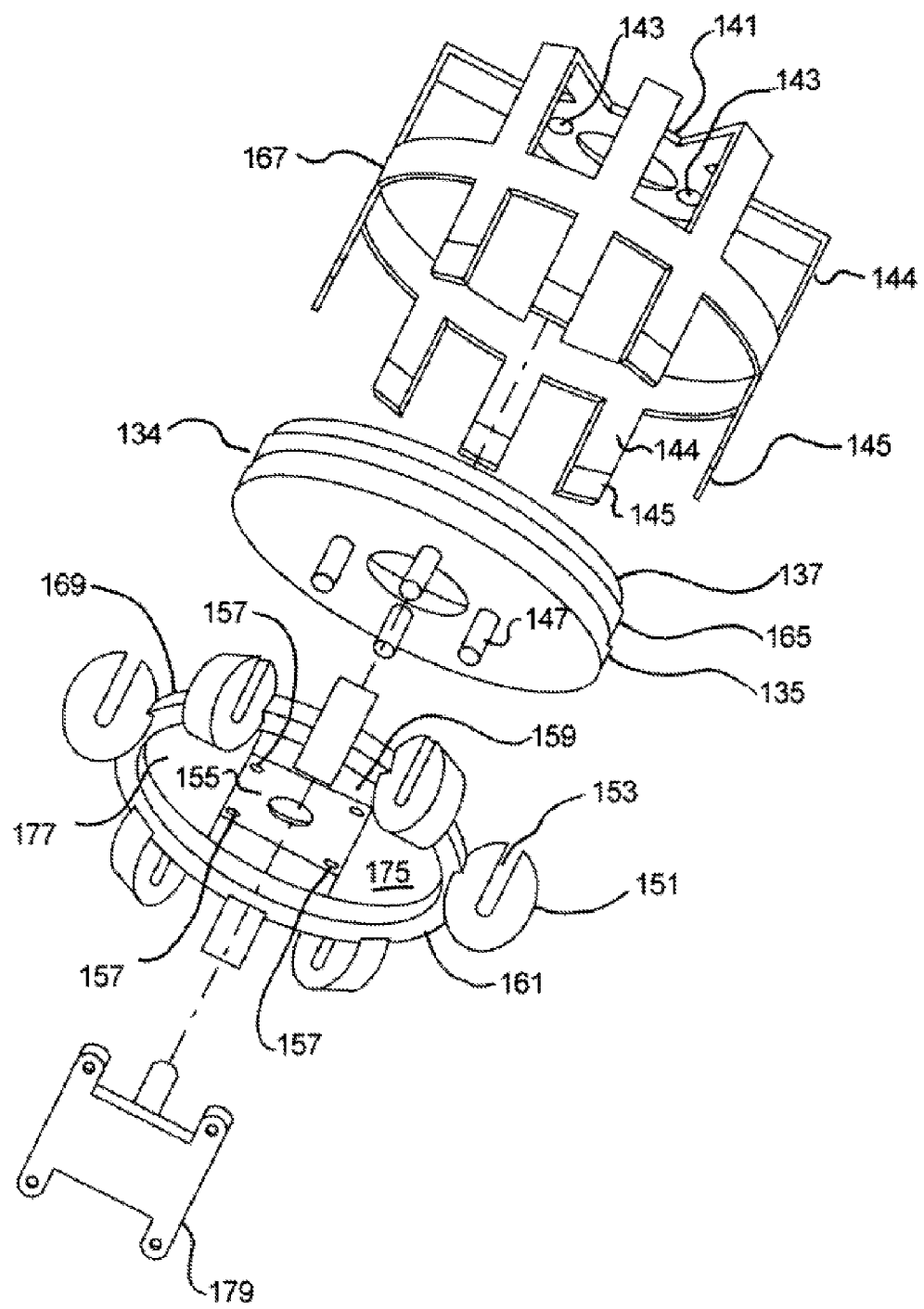
FIG. 12 is an exploded ¾ view of the hub-mounted wheel-motor.
Figure 13:
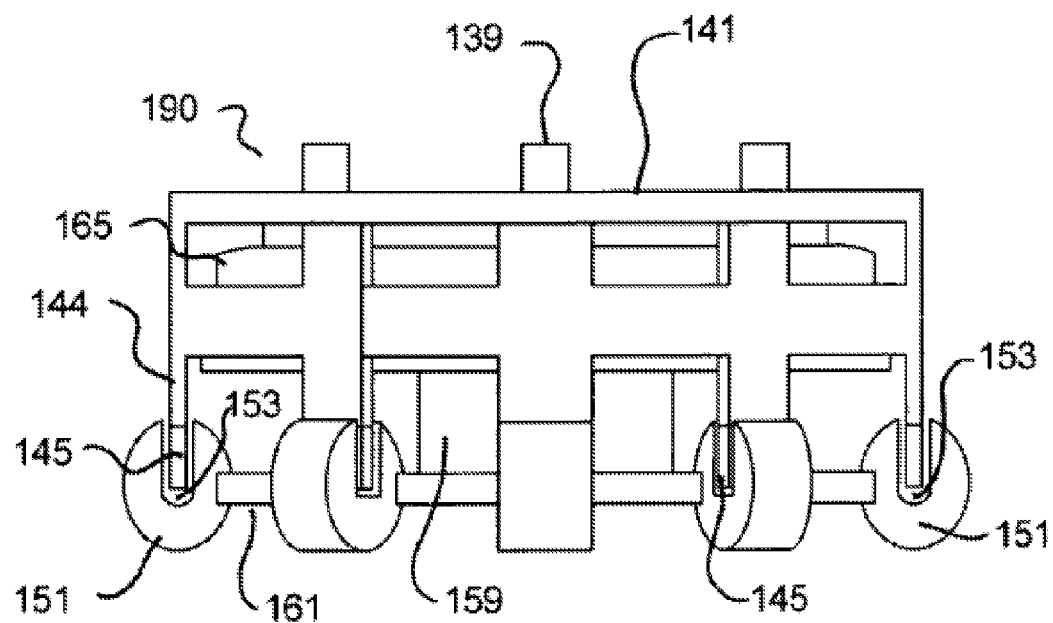
FIG. 13 is an assembled side view of the hub-mounted wheel-motor.

FIGS. 12 and 13 show another view of the individual components and also a view with all four components assembled to create a DC brushless motor, configured, the rotor and stator thereof configured after the manner of a clamshell, the rotor (167) being shaped like a basket surrounding the spindle assembly (134), and the stator (169) resembling a lid for the basket.

Thus, in this "clamshell" configuration, the rotor (167) and stator (169) form an essentially closed case or basket. Thus configured, they can be opened from each other by simply removing the wheel (181) that they drive, one of the two components remaining in place with the spindle assembly (134), and the other portion free to be removed no longer being pressed between wheel (183) and the rotating portion (137) by the lug nuts.

When in operative disposition, the stator (169) and rotor (167) are an integral part of the wheel-vehicle communication assembly and make use of the existing axle, and spindle assembly (134). By integrating a stator (169) and rotor (167) into an existing spindle assembly (134), the added design, cost, and reliability issues created by the necessity of newly designed axles, bearings, and brakes inherent to other wheel hub motor applications is avoided.

Figure 11:
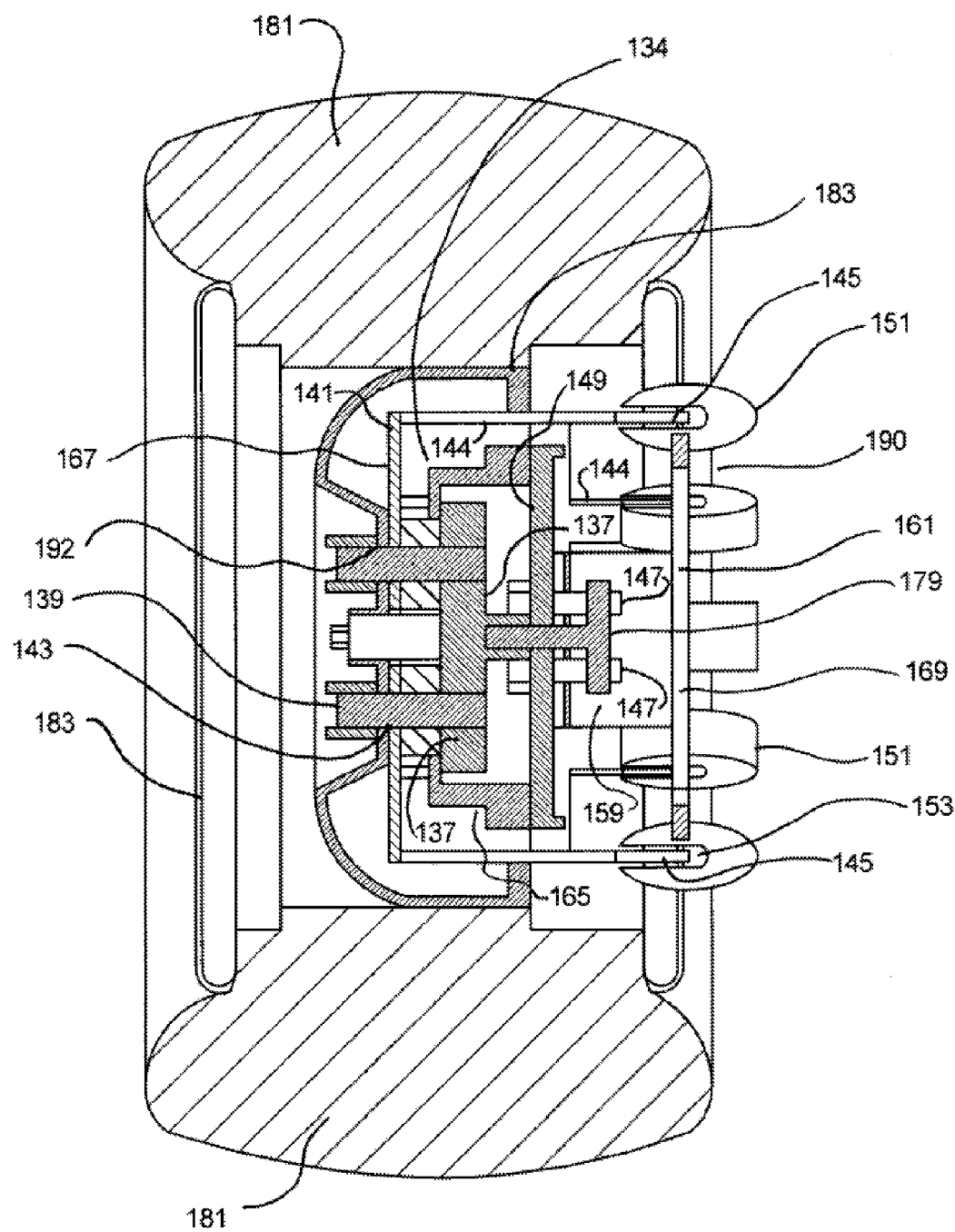
FIG. 11 is a cross-sectional side view of an embodiment of the hub-mounted wheel-motor.

Finally, continuing the conceptual overview, FIG. 11 shows a wheel (181) attached to a spindle assembly (134) for hybrid operation. The rotor (167) and stator (169) are integrated into the vehicle components in such a way as to be mechanically transparent when the DC brushless motor is not in operation. It adds slight weight, but little else.

Having completed this overview, the reader may begin more detailed examination by examining FIG. 1, which shows an electric drive system (110) augmenting an internal combustion drive system. The said electric drive system (110) comprises an electric motor (115) that drives a vehicle wheel (not shown), having a sensor-module (117) to detect electric motor (115) performance and electric motor (115) element disposition, a logic/control module (119), a battery (121), engine-load-level-sensor (129), engine-load-level-sensor-logic/control module interface (123), logic/control module-battery, cell, or other energy storage device interface (125), battery, cell, or other energy storage device-electric motor interface (127), and electric motor-logic/control module interface (128). Looking now at FIG. 2A, showing a hub-mounted wheel-motor (163), one sees a substantially annular wheel-support-hub (165) comprising a rotating portion (137) rotatably communicating with a non-rotating, hub-portion (135). Also, the rotating portion (137) comprises stud bolts (139) extending substantially perpendicularly from said rotating portion (137) and that the non-rotating hub-portion (135) comprises hub-bolts (147) extending substantially perpendicularly therefrom.

Attending again to FIG. 2A, noted is a non-movable axle support (131) which those skilled in the automotive art will readily appreciate is attached to the body or frame of a vehicle. Also, extending through said axle support (131), is an axle (133) which extends through the non-rotating hub-portion (135) to communicate with the rotating hub-portion (137) in order to rotate said rotating hub-portion (137) of the wheel-support-hub (165). In addition, one may note that the non-movable axle support (131) comprises a non-movable hub-plate (149) having hub-plate-holes (171).

Figure 4:
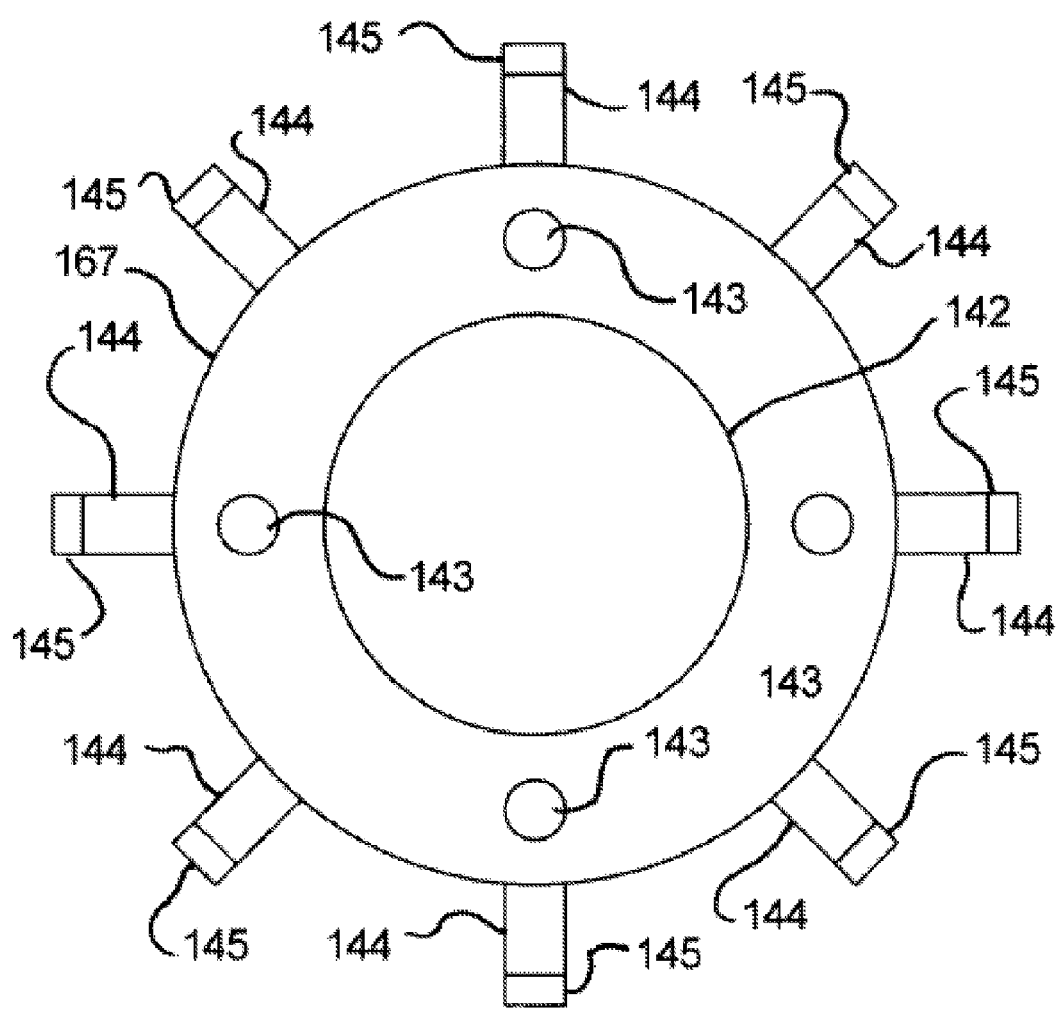
FIG. 4 is a top view of a basket rotor.
Figure 5:
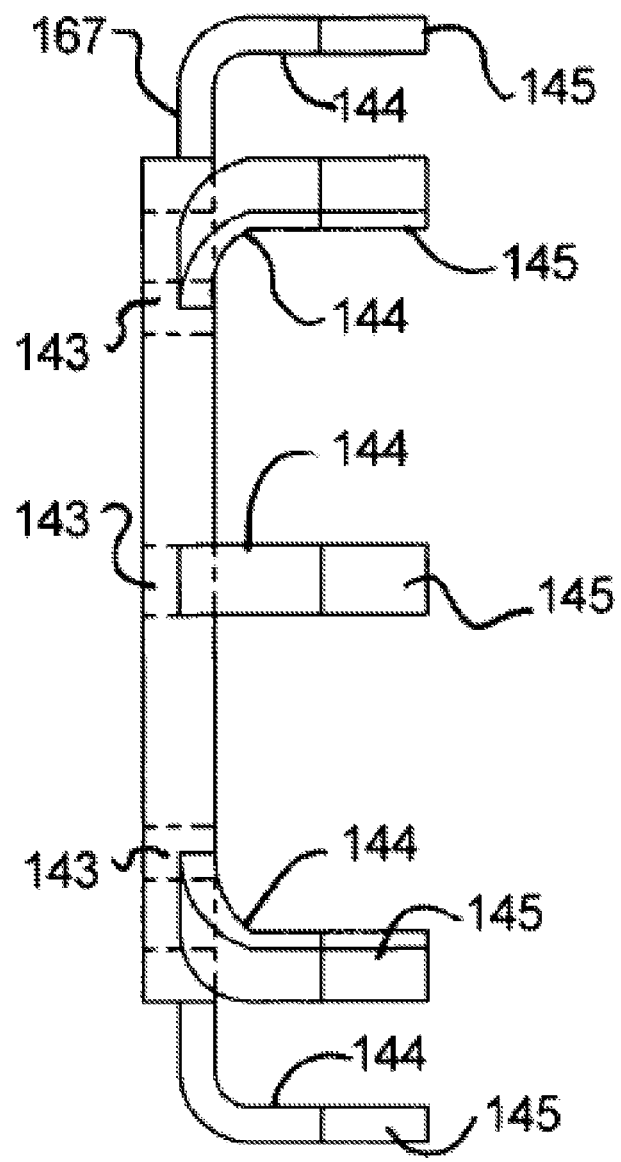
FIG. 5 is a side view of a basket rotor.

FIG. 2A, FIG. 4 and FIG. 5, show a rotor (167) comprising a plate (141) having holes (143) and a plurality of rotor-arms (144) extending at a substantially perpendicular angle to the plane of the rotor-plate (141) with permanent magnets (145) disposed at the extremities of the rotor-arms (144) opposite the rotor-plate (141). Also, seen is that said permanent magnets (145) are disposed in an essentially annular array.

Figure 6:
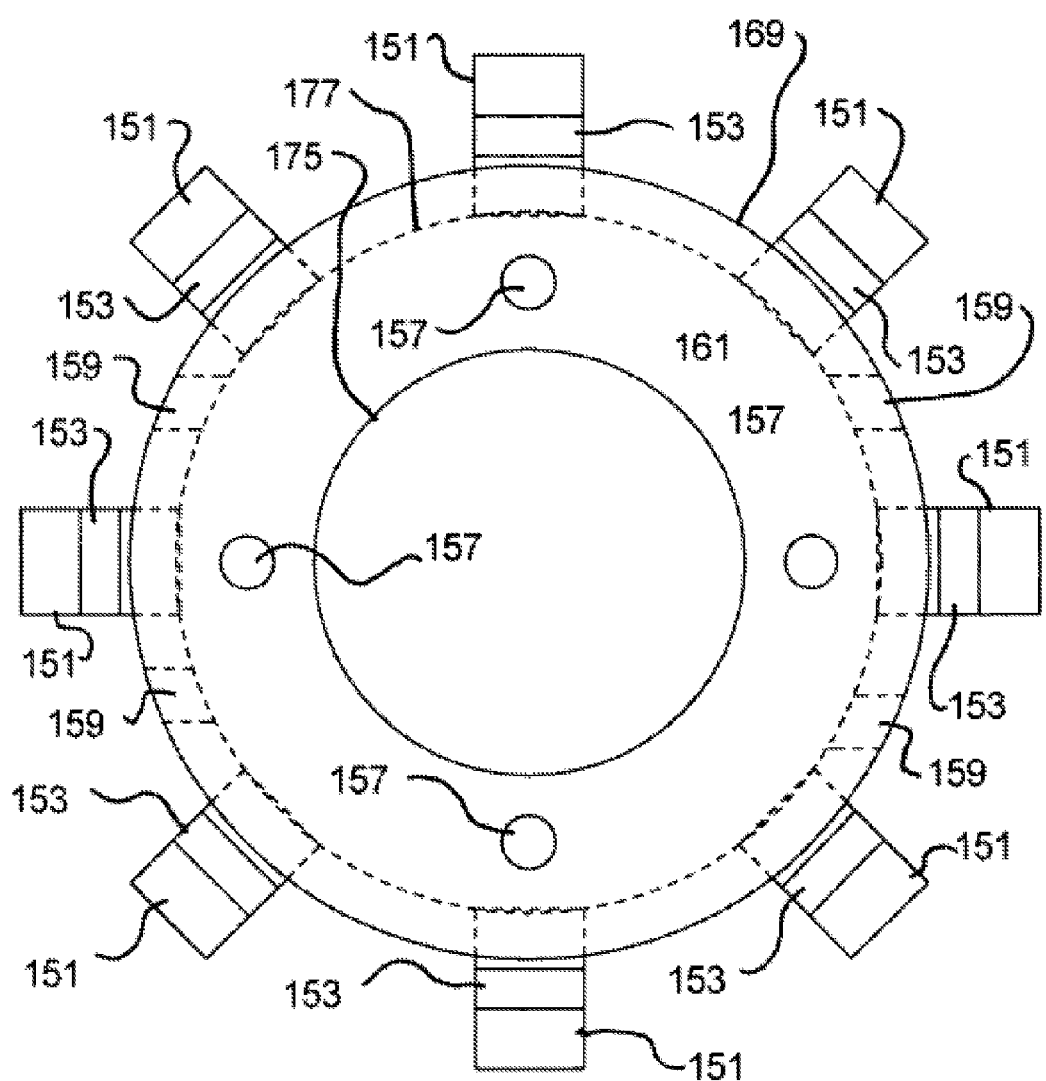
FIG. 6 is a bottom view of a stator.
Figure 7:
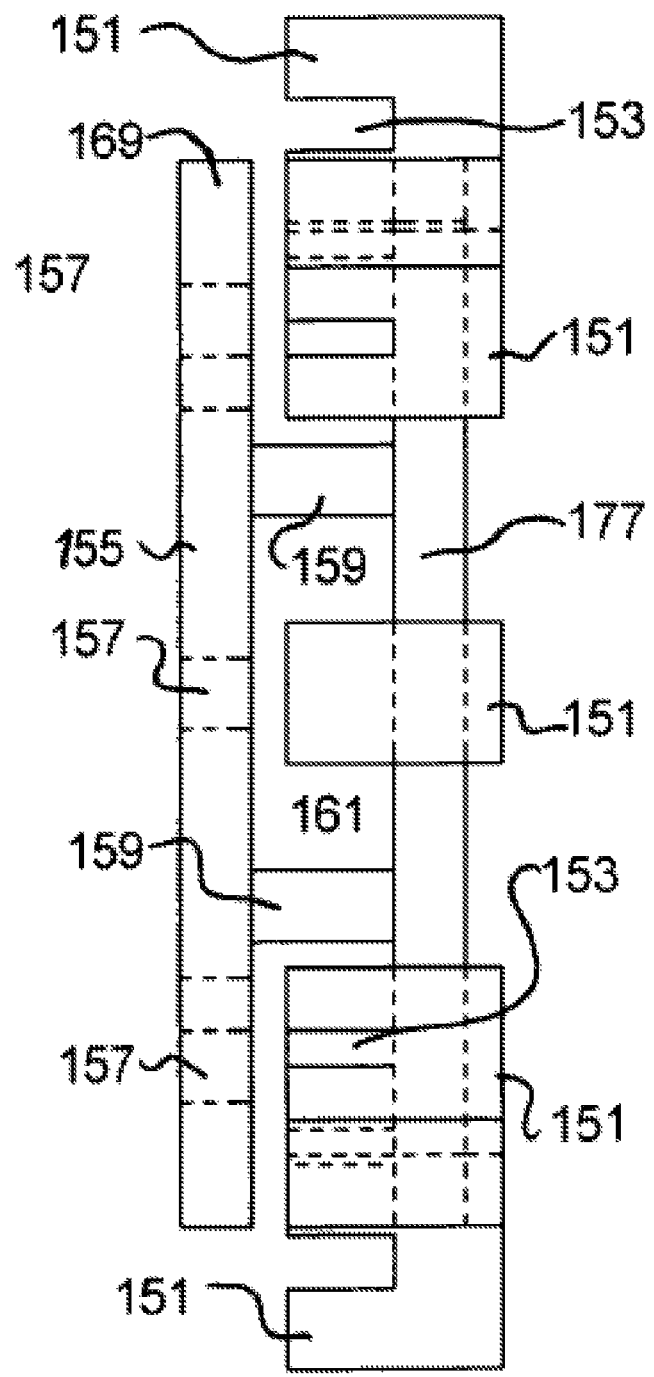
FIG. 7 is a side view of a stator.

Attending now to FIG. 2A, FIG. 6, and FIG. 7, one sees a stator (169) comprising a stator-plate (155) having holes (157), a central void (175) through which the non-movable axle support (131) and/or drive-axle (133) may pass, and stator-arms (159) extending substantially perpendicularly from the periphery of the stator-plate (155). Also noted is that the stator-arms (159) support a stator-ring (161) essentially parallel to the stator-plate (155), said stator-ring (161) comprising an aperture (177) through which the non-movable axle support (131) and/or drive-axle (133) may pass. Supported by the stator-ring (161) are electromagnets (151) having slots (153), said slots (153) oriented substantially perpendicularly to the stator-plate (155). Also, we note that said slots (153) are disposed in a substantially annular array.

Looking now at FIGS. 2AB, 9, 10, 11, 12, 13, 14, and 15 one notes that the hub-bolts (147) align with the hub-plate-holes (171) and the stator-plate holes (157) and may be extended there-through so that a portion of said hub-bolts (147) may extend beyond the stator-plate (155). Now one may readily appreciate that a nut (not shown) may be engaged by the hub-bolts (147) to fix the stator (169), the non-movable hub-plate (149), and the non-rotating hub-portion (135) of the wheel-support-hub (165) in a functional disposition.

Figure 8:
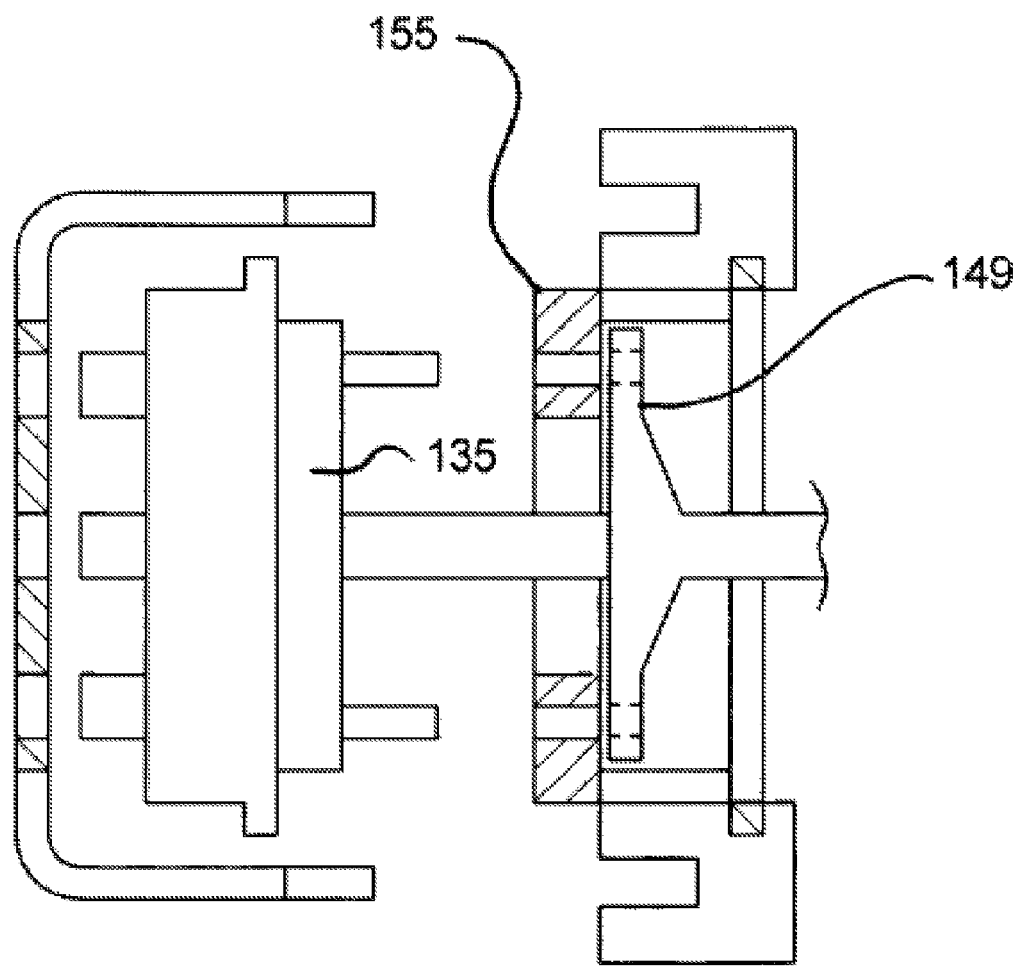
FIG. 8 is a view of alternate dispositions of elements of the hub-mounted wheel-motor.

FIG. 8, shows that the stator-plate (155) may be configured so that said stator-plate (155) is disposed between the non-rotating hub-portion (135) and the non-movable hub-plate (149).

FIGS. 2B, 9, 10, 11, 12, 13, 14, and 15, show that the rotor-plate holes (143) align with the stud bolts (139) so that the stud bolts (139) may extend through them and continue beyond the rotor-plate (141). Thus, one may readily appreciate that said extension would allow a wheel-rim and hub (183) mounting a tire (181), and having holes (192) corresponding to said stud bolts (139) to be mounted on the wheel-support-hub (165) with the rotor (167) held therebetween, the whole held fixed by nuts (not shown) engaging the stud-bolts (139). In addition, one notes in FIGS. 9, 10, 11, 12, 13, 14, and 15, that the means to facilitate the transfer of rotary motion to the wheel-support-hub (165) may comprise a plate-mounted-support pin (179).

Figure 2B:
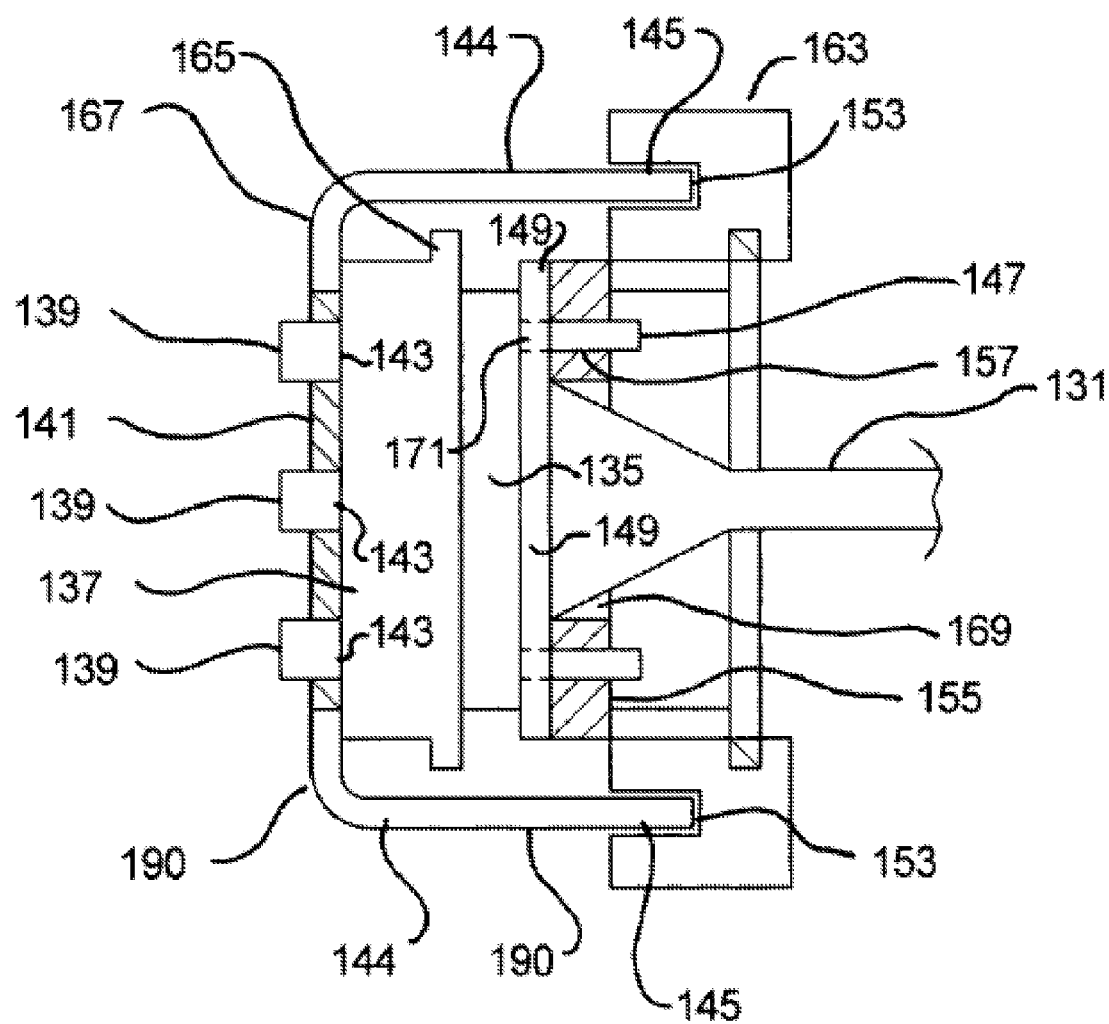
FIG. 2B is a non-exploded side view of the FIG. 2 hub-mounted wheel-motor with some parts in cross-section.

Looking yet again at FIG. 2B, we note that diameter of the rotor-plate (141) is greater than both the diameter of the wheel-support-hub (165), the diameter of the non-movable hub-plate (149), and the diameter of the stator-plate (155) such that when the rotor (167), wheel-support-hub (165), non-movable axle support (131), and stator (169) communicate as previously described, the rotor-arms (144) will extend such that the rotor permanent magnets (145) disposed at the extremities of the rotor-arms (144) opposite the rotor-plate (141) will be oriented in the electromagnet slots (153).

Thus, is understood that when the rotating hub-portion (137) rotates, the rotor (167) will also rotate while the non-rotating hub-portion (135), the non-movable hub-plate (149), and the stator (169) will not rotate. Therefore, is also realized that when the rotor (167) rotates, the permanent magnets (145) will successively pass through each non-moving electromagnet slot (153).

In additionally sophisticated modes, the rotor (167) may comprise permanent magnet(s) of alternating polarity, and the stator (169) may comprise electromagnet(s) having phased and/or variable polarity. Further, the stator polarity may be controlled by a sensor and logic device responsive to position, power, velocity, and/or other factors. One product of such control can be an electromagnetic pull-in, then, push-out functional relationship between the non-rotating electromagnetic stator (169) and the permanent magnet rotating rotor (167). As a rotor-arm (144) approaches a stator-arm (159), the electromagnetic polarity of the stator-arm (159) it approaches pulls the rotor-arm (144) toward itself, while the electromagnetic polarity of the stator-arm (159) the rotor-arm (144) is just passing, pushes it away.

Now, those skilled in the art will readily appreciate that the rotor (167) and stator (169), disposed as previously described, comprising an electric motor (190) may be incorporated into sundry vehicle system designs already extant. We may additionally understand that construction of said electric motor (190) is accomplished by the integration of the rotor (167) and stator (169) with elements common to the preponderant portion of extant motor vehicles essentially without modification of or sophistication of any said elements.

Thus, by exploitation of the instant art, an electric motor for motive power may be added to most present vehicles and vehicle design without significant modification of or sophistication of any parts of these vehicles. And, by exploitation of the instant art, an electric motor for motive power may be added to most motor vehicles during the manufacture of said vehicles without the redesign or remanufacture of any elements comprising said vehicles.

Those skilled in the art will additionally recognize that the electric motor (190) taught by the instant art, when employed to hybridize a vehicle, may, occasionally also serve as an electric power source, whereby drag from the generation of electrical energy may be exploited to provide vehicle deceleration and braking, the functional shift from motor to generator and back again being executed by a sensor/logic/switching system, sundry of which are well known in the art. Thus, electricity produced thereby may be used to recharge a battery, cell, or other energy storage device carried aboard the vehicle. Also, activation/deactivation of the system may be automated by employing sensor and logic systems to detect and respond to optimum conditions for bringing appropriate components of the system on-line and for taking the system off-line. Sensors that might be employed for such purposes include an electric motor/generator rotor position sensor, automobile brake light switch, organic cruise control, accelerometers, and other like sensors. Although not shown in the drawings, such components and functions are, by this addressed and taught, herein. Incorporation of input from such sensor systems as are already organic to the associated vehicle can produce significant savings in overall system cost and expense.

Further, it is particularly notable that the herein taught hub-mounted electric motor (163) may function, and produce considerable power, fitted with as little as only one stator-arm and electromagnet (151). This is a significant advantage with regard to implementation on a wide variety of rear wheel configurations.

In addition, those skilled in the art will also readily appreciate that while the components used to accomplish functional communication between a rotating element and an axle of a vehicle may vary significantly in appearance from those shown, the principles utilized to do so are essentially the same in substantially all instances. Namely, a non-rotating element of the motor (163) is attached to a non-rotating portion of a hub assembly (135), and a rotating element of the motor (163) is supported by a rotating portion of a hub assembly wheel-support-hub (137). Thus, we may understand that the instant art may be contrived to be employed in virtually any vehicle without departing from the previous showing and description.

Figure 3A:
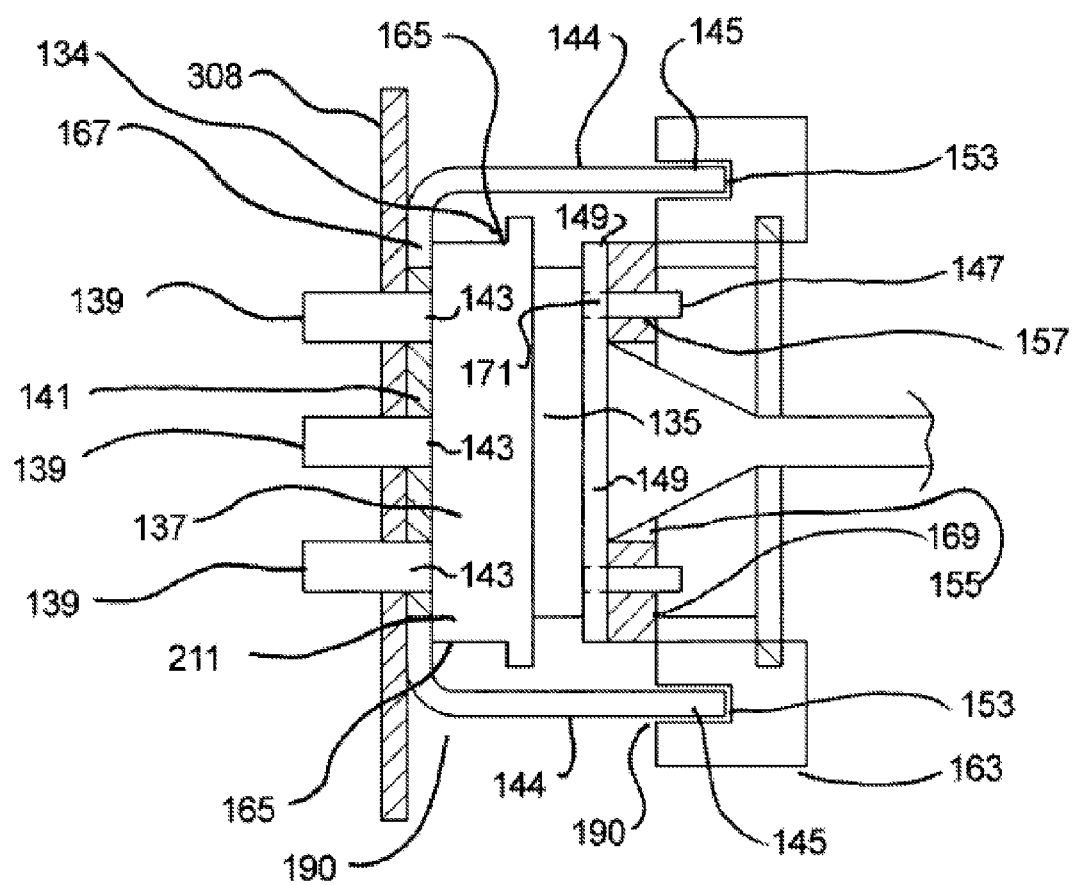
FIG. 3A is a non-exploded side view of a hub-mounted wheel-motor with some parts in cross-section.
Figure 3B:
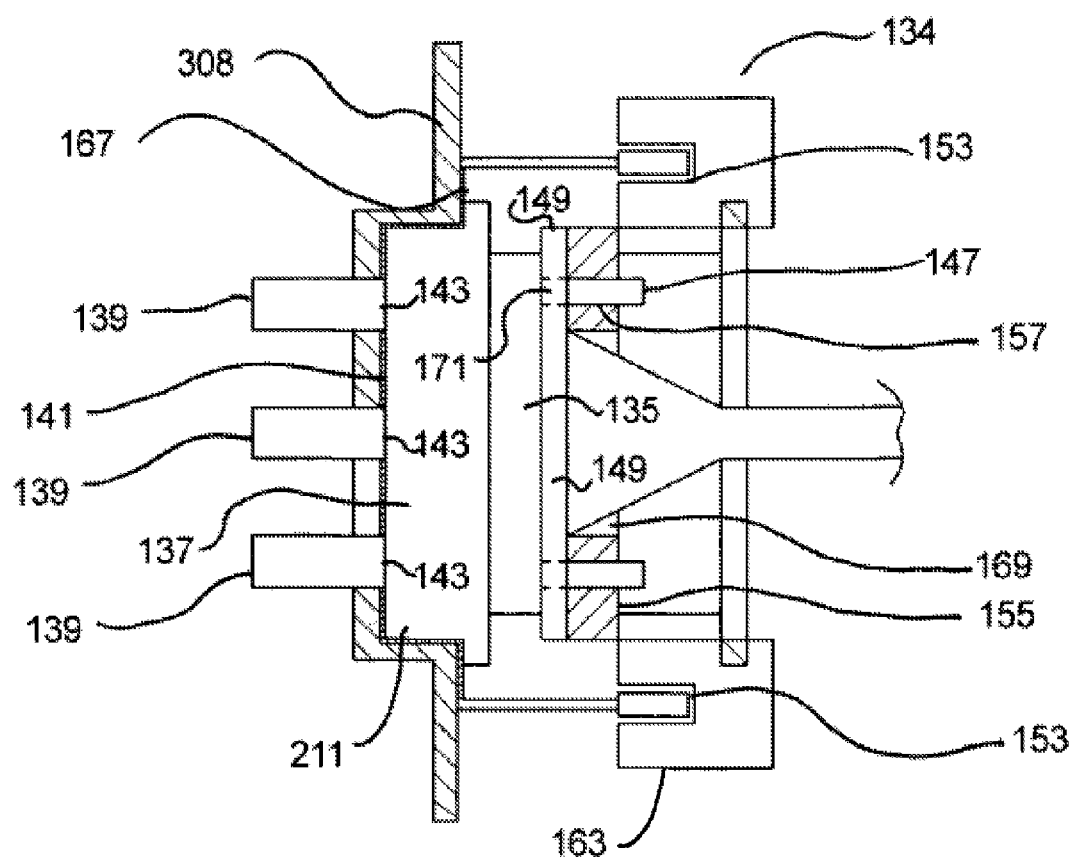
FIG. 3B is a side view of a hub-mounted wheel-motor with some parts in cross-section.

The instant art has been described in communication with a hub or spindle assembly comprising a typical drum (211) having drum type brakes housed internally thereto. However, FIG. 3A and FIG. 3B show that the instant art may function comparably with a spindle assembly (134) having a disk type braking system. Seen in FIG. 3A and FIG. 3B is a typical drum (211) having a rotatable portion (137) and a non-rotating portion (135) communicating with a stator (169) as previously described.

Additionally, a rotor (167) is shown attached to each rotating hub-portion (137) by means of stud bolts (139) which pass through rotor-plate holes (143). Also seen in each said figure is an un-modified brake rotor disk (308) communicating with stud bolts (139) such that the rotor-plate (141) is pressed between the hub rotating portion (137) and the un-modified brake rotor/disk. Noted also is that in FIG. 3A and FIG. 3B, the rotor permanent magnets (145) communicate with the stator electromagnets (151) as previously described.

It is an object of the instant art to provide components of a hub-mounted wheel-motor (163) which communicate with but are not integral to elements of extant vehicle wheel-vehicle communication structures thusly requiring no modification of said extant structure elements. However, there may arise occasions when integrating an instant art component with a hub or spindle or assembly is advantageous.

In example, an automobile manufacturer might gain economic advantage by manufacturing a rotating hub-portion (137) having magnets affixed or a brake rotor/disk (308) having magnets embedded in a portion thereof as will be described in due course. Not having to fabricate two individual elements may optimize economy of labor and material without departing from a basic principle of the instant art, viz. a motor comprised of elements which disassemble or assemble as the hub or spindle assembly is disassembled or assembled and wherein motor elements have no separate supports or housings, but are supported and/or housed by elements of the spindle assembly (134).

Figure 17:
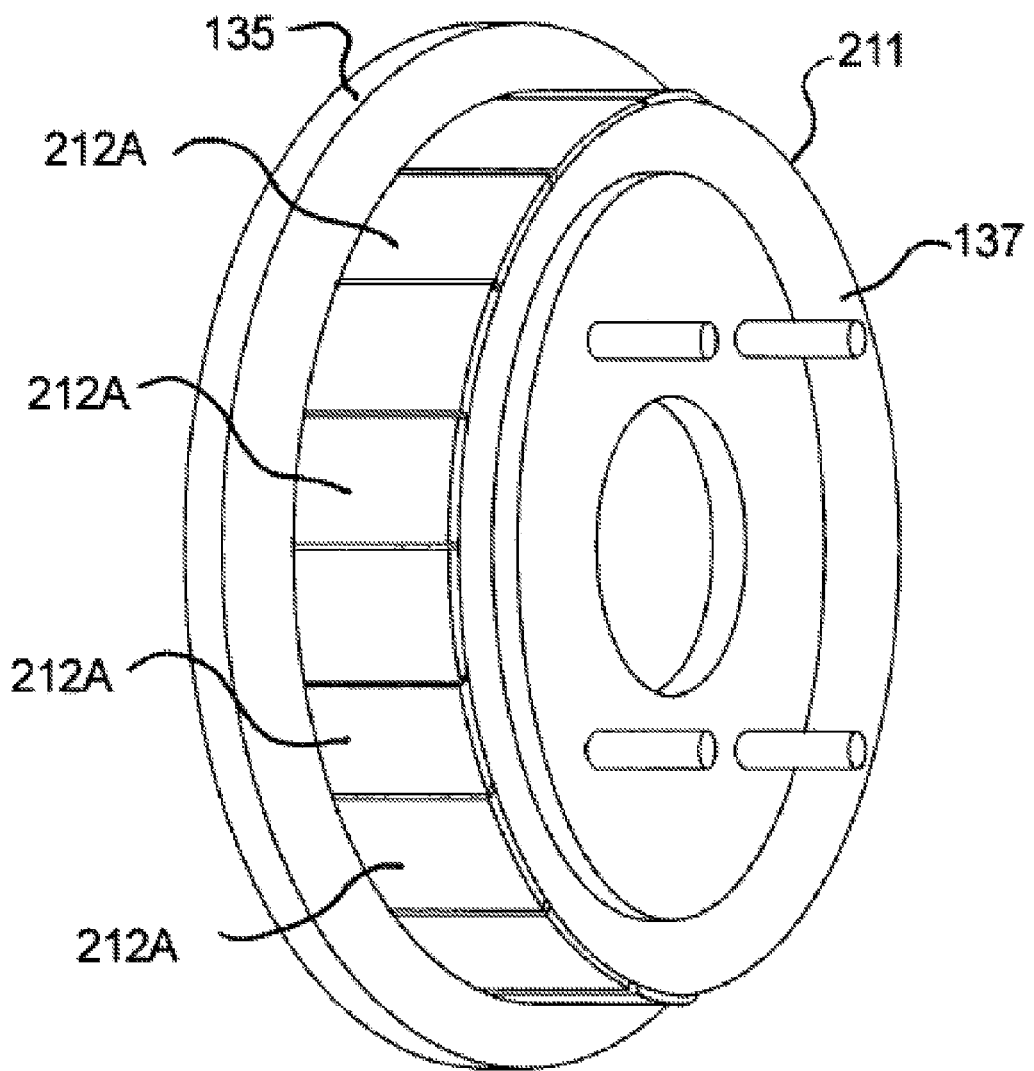
FIG. 17 is an assembled ¾ view of the brake drum and magnet ring.
Figure 18:
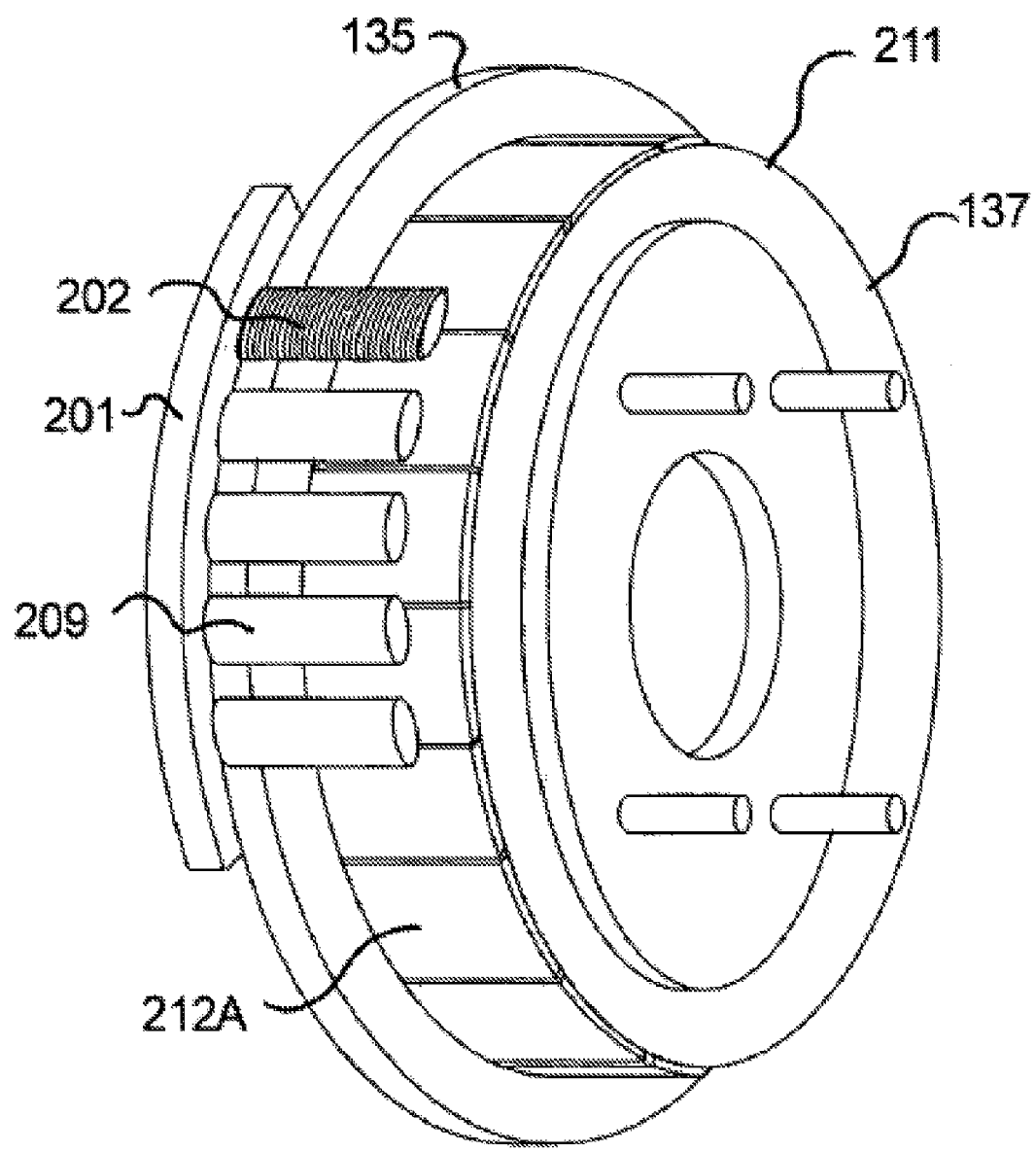
FIG. 18 is an assembled ¾ view of the brake drum, magnet ring, and stator.

Such a further variation of this basic design, involves, as described in detail below, a brake drum (211) wherein the exterior of the rotating portion (137) thereof comprises an annular ring (212) having an array of permanent magnets (212A). Alternatively, the brake drum (211) may have magnets (145) embedded around its exterior periphery (214). These are depicted in FIGS. 16-18.

In another approach, if the vehicle braking system is disk brake type configured with a brake rotor/disk (308), the rotor/disk (308) may be made of a non-ferromagnetic material and have permanent magnets (212A) embedded therein. These are depicted in FIGS. 19-22. The assembly holding the disc brake pads (314) is also somewhat modified from that of the other configurations The advantage of this approach is that it makes additional space available for an electromagnet assembly comprising stator (301). The stator (301) wraps around up to 180 degrees of the rotor (308), thus allowing much more torque to be created. While the option of modifying the rotor/disk (308) and disc pad (314) adds complexity in the installation process, the ultimate mechanical simplicity and universal applicability are attractive.

Another variation, also described in detail, below, which is similar to the previously described clamshell configuration, employs an axial flux arrangement. These are depicted in FIGS. 24-30. The difference between the two, both of which incorporate a clamshell configuration, is in the permanent magnet/electromagnet interaction geometry. In the former configuration the electromagnet (151) is shaped like the letter "C." But in the latter (axial) configuration, the shape of the electromagnet (151) is more typical of a conventional electric motor design.

Figure 16:
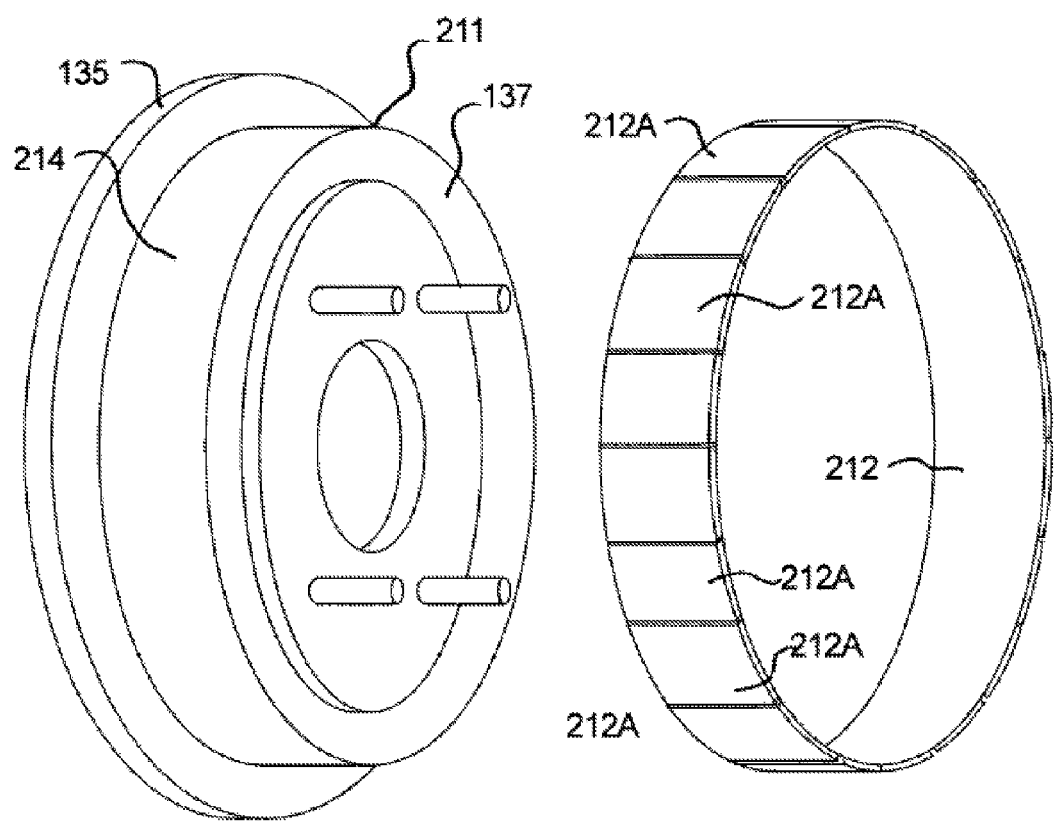
FIG. 16 is an exploded ¾ view of the brake drum and magnet ring.

FIG. 16 shows a typical drum (211) that is found on many passenger vehicles and light trucks. The drum (211) material is essentially the same as that used by conventional automobile original equipment manufacturers. It also shows a ferromagnetic ring (212) with permanent magnets (212A) integrated within the ring itself. This ring (212) slides over the drum (211) in an interference fit, thermal fit, or any other means of attachment, in example slot and key, splines, adhesive, etc. Alternatively, the drum (211) may be manufactured with the magnets (212A) already embedded into the outer drum. This configuration is illustrated in FIG. 17.

FIG. 18 displays a stator (201) component. This stator (201) is bolted proximal to the drum (211) such that the stator-poles (209) are parallel to the exterior surfaces (212B) of the permanent magnets (212A). The stator-poles (209) extending from the base of the stator (201) are wound with electric motor wire (202) (here depicted on only one stator pole (209)) and function as electromagnets in what effectively comprises a D.C. brushless motor.

These wire-wound stator-poles (209) extruding from the stator (201), do not touch the permanent neodymium magnets (212) on the drum (211). The angular spacing of the permanent magnets (212) around the circumference of the drum (211) may be equal to the angular spacing of the wound stator-poles (209) or may vary.

Incorporation of suitable electronic controls to energize and de-energize the electromagnetic characteristic of the stator-poles (209) at the proper times relative to the rotation and position of the permanent magnets (212) constitutes the basic elements of a D.C. brushless electric motor. In this application the brake drum (211) serves as the rotor of the electric motor and the array of electromagnetic stator-poles (209) functions as the motor stator (201). By properly controlling activation of the electromagnetic stator-poles (209) of the stator (201), with reference to the rotation and relative position of the rotor magnets (212), rotary motion of the brake drum rotor (211) may be induced or constrained. Thus, they may be used to drive a wheel, or to induce braking.

Figure 19:
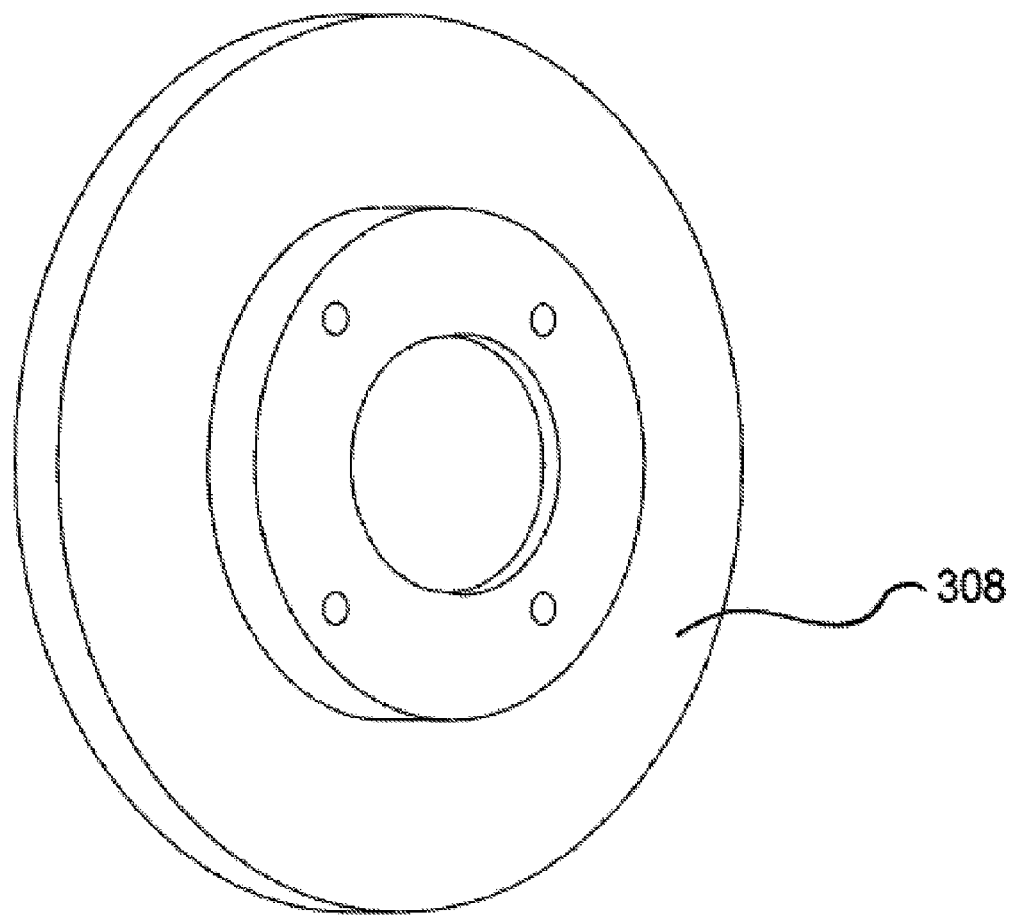
FIG. 19 is a ¾ view of a non-ferrous semi-alloy metallic rotor.

FIG. 19 shows an un-modified brake rotor/disk (308) as is typically used in the rear wheels of a car or small truck. In the present application, this rotor/disk (308) is made of a non-ferrous material like a non-magnetic metal alloy, ceramic material, or organic-based material such as carbon fiber or high temperature polymer.

Figure 20:
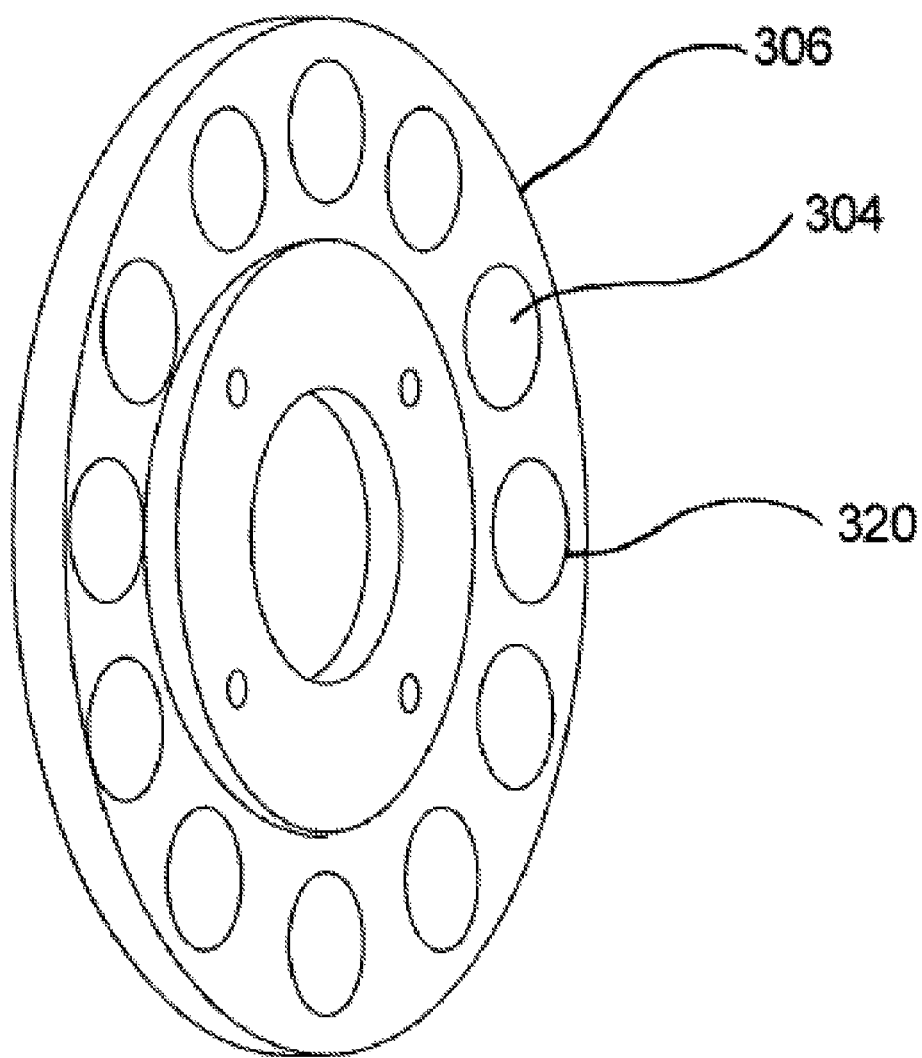
FIG. 20 is a ¾ view of a non-ferrous semi-alloy metallic rotor with neodymium magnets.

FIG. 20 shows a series of round magnets (304) installed in holes (320) drilled in the non-magnetic rotor/disk (308) and the installation. The magnets (304), for the purposes of this illustration are of the permanently magnetized variety. As shown in FIG. 30D, the magnets (304) are positioned in the holes (320) such that the surfaces (304A) of each magnet (304) are below the surfaces of the two sides 308A and 308B of the rotor/disk (308) surrounding each hole (320). This ensures that the brake pad (314) does not touch or wear against the permanent magnets (304) when the brakes are engaged. Also, the edges (321) of the holes (320) holding the permanent magnets (304) are chamfered (322) to prevent wear on the brake disc-pads (314). The size of the swept area between the brake disc-pads (314) and brake rotor/disk (308) must be sufficient to create whatever braking force is necessary for a given application.

Figure 21:
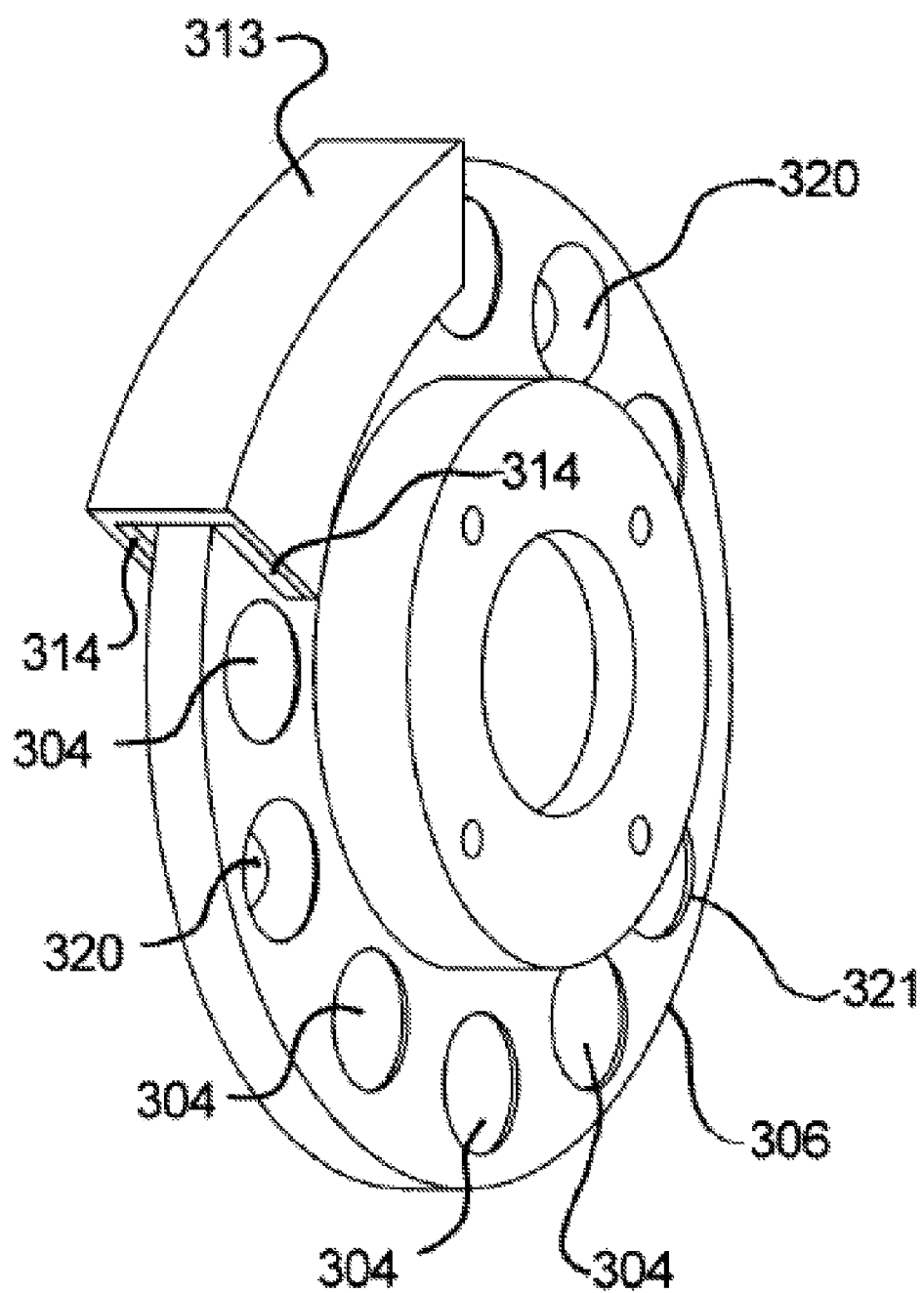
FIG. 21 is a ¾ view of a non-ferrous semi-alloy metallic rotor with neodymium magnets, plus brake caliper and pads, having with two magnets removed for illustration.

FIG. 21 shows the modified rotor/disk (308) with the permanent magnets (304) and the caliper (313) which holds and actuates the disc-pads (314) on both sides (308A), (308B), of the rotor/disk (308). Since the rotor/disk (308) can become hot in this application, if permanent magnets are employed they must be of a type that have good thermal stability.

Figure 22:
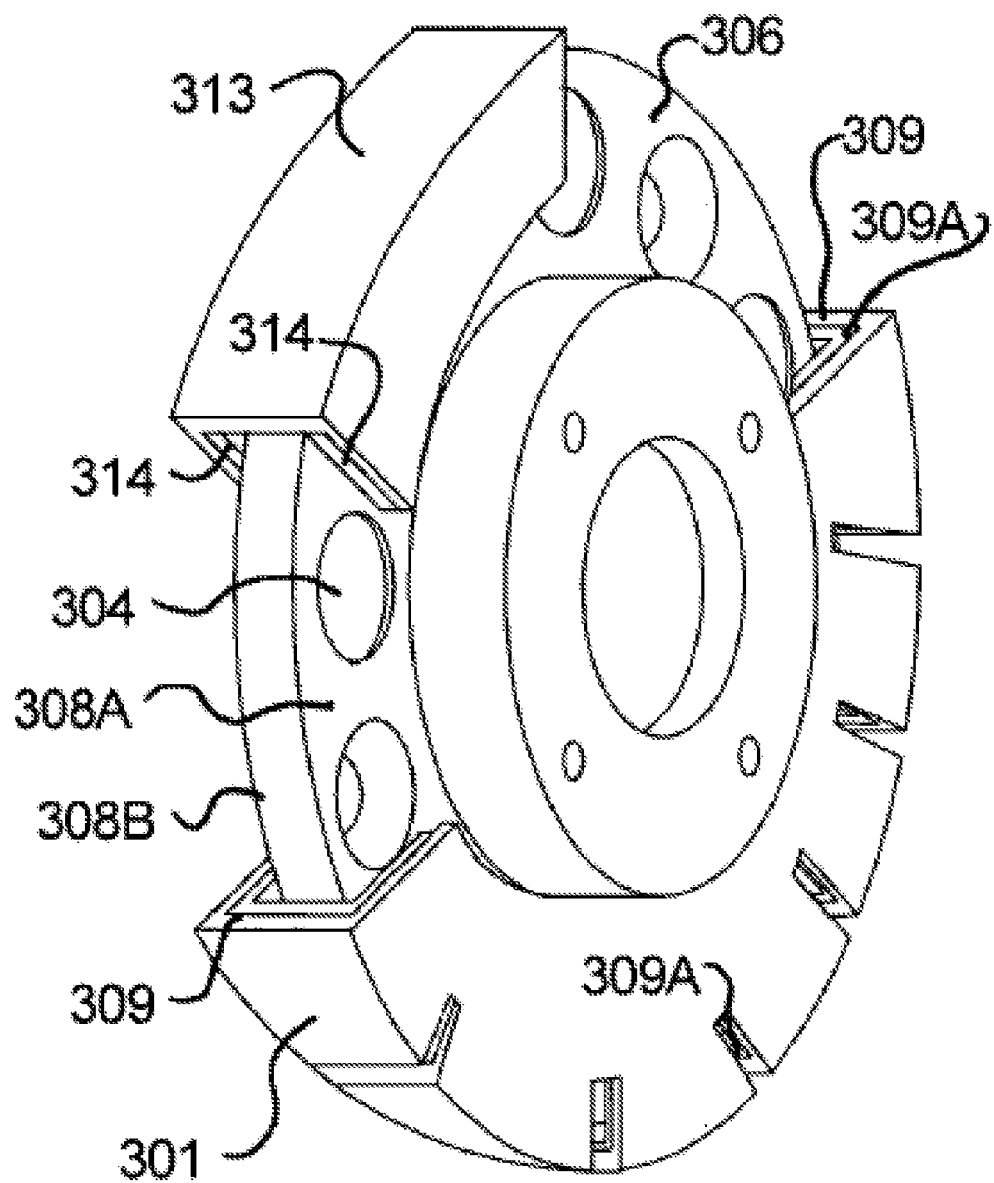
FIG. 22 is a ¾ view of a non-ferrous semi-alloy metallic rotor with neodymium magnets, plus brake caliper, brake pads, and stator.
Figure 23:
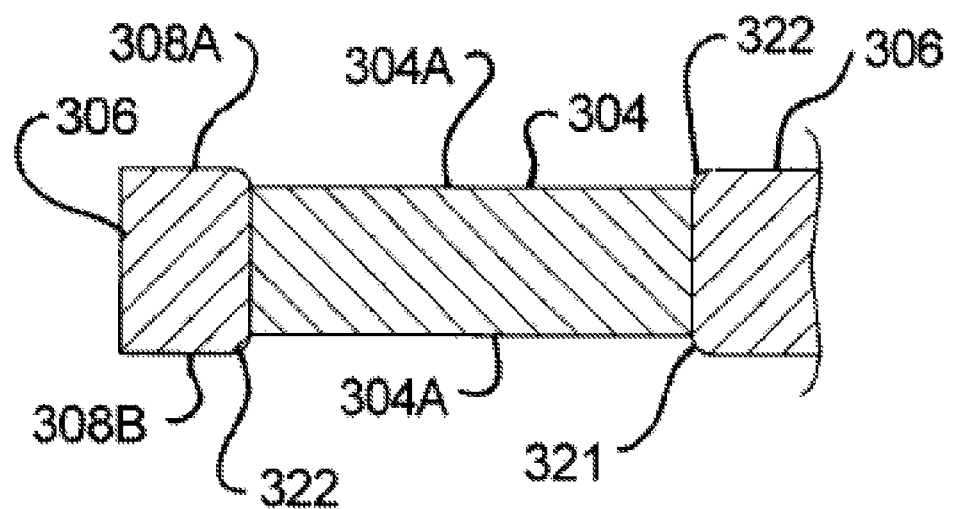
FIG. 23 is a cross-sectional view of a portion of a portion of a brake rotor/disk with magnet embedded.

FIG. 22 shows addition of a stator (301) which is an assembly that holds a series of electromagnets (309A) comprising stator-poles (309) with each electromagnet (309A) being formed in a "C" shape so it may be positioned to partially wrap around the rotor/disk (308) thus allowing each electromagnet (309A) to magnetically interact with the permanent magnets (304) on the rotor/disk (308).

The angular spacing of the electromagnets (309A) around the circumference of the stator (301) may be the same as the angular spacing of the permanent magnets (304) around the rotor/disk (308) or may vary. Thus, the array of electromagnets (309A), configured in this way, may be positioned such that faces of the stator-poles (309) "C" shaped electromagnets (309A) correspond to the locations of the permanent magnets. In this way, the multiple poles (309) of the stator (301) collectively form the poles of an electric motor.

Incorporation of suitable electronic controls to energize and de-energize the electromagnetic characteristic of the stator-poles (309) at the proper times relative to the rotation and position of the permanent magnets (312) constitutes the basic elements of a D.C. brushless electric motor. In this application the brake drum rotor (308) serves at the rotor of the electric motor and the array of electromagnet (309A) functions as the motor stator (301).

By properly controlling activation of the stator electromagnets (330) of the stator (301), with reference to the rotation and relative position of the rotor magnets (304), torque may be created, and thereby rotary motion of the rotor/disk (308) may be induced or constrained. Thus, they may be used to drive a wheel, or to induce braking.

It is, of course, also possible to cause such torque by varying the electromagnetism of both the rotor/disk (308) and the stator (301), or by holding constant the magnetic force exerted by the stator (301) and varying only the magnetism of the rotor/disk (308).

Figure 24:
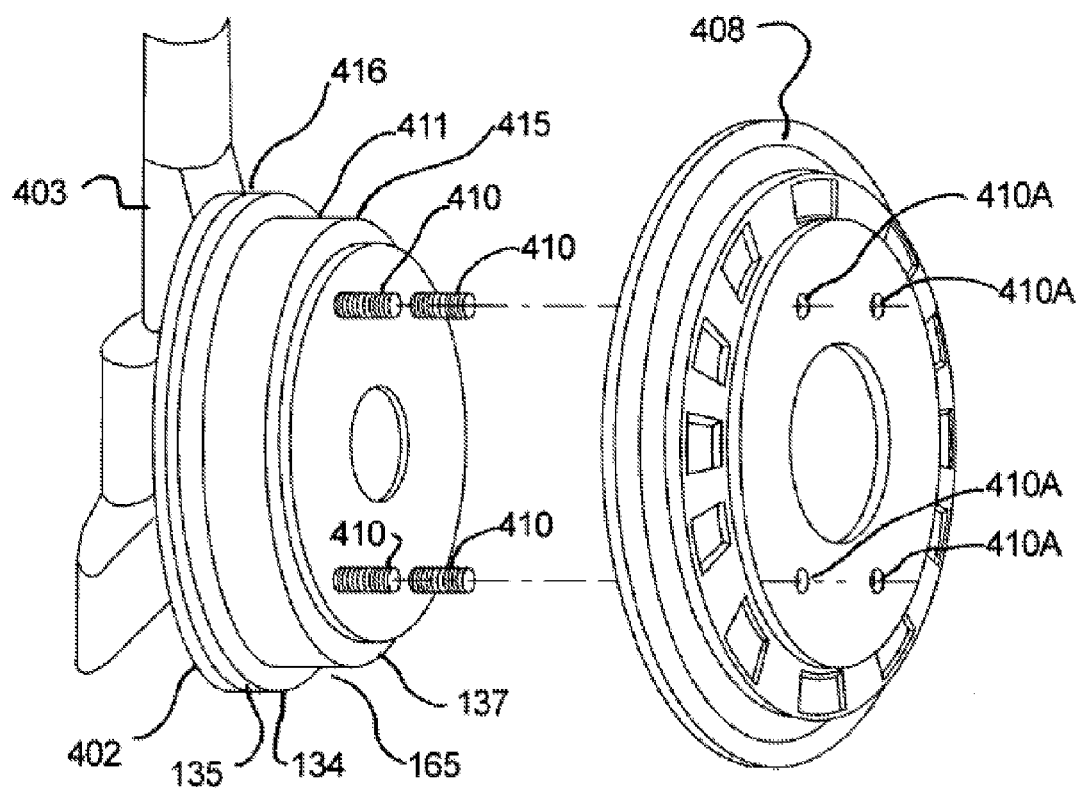
FIG. 24 is an exploded ¾ view of a control-arm spindle, brake drum and slip-on rotor.

FIG. 24 shows a typical automobile rear suspension assembly. This includes the drum (411), having a rotatable element (415) and a stationary element (416), the rotatable element (415) having studs (410), backing-plate (402), attached to the stationary element (416), lower control-arm spindle (403), and wheel-mounting-studs (410). A slip-on rotor (408), with mounting-holes (410A) is shown aligned for installation by sliding the mounting-holes (410A) over the studs (410). The stator (401) is not shown in this drawing.

Figure 25:
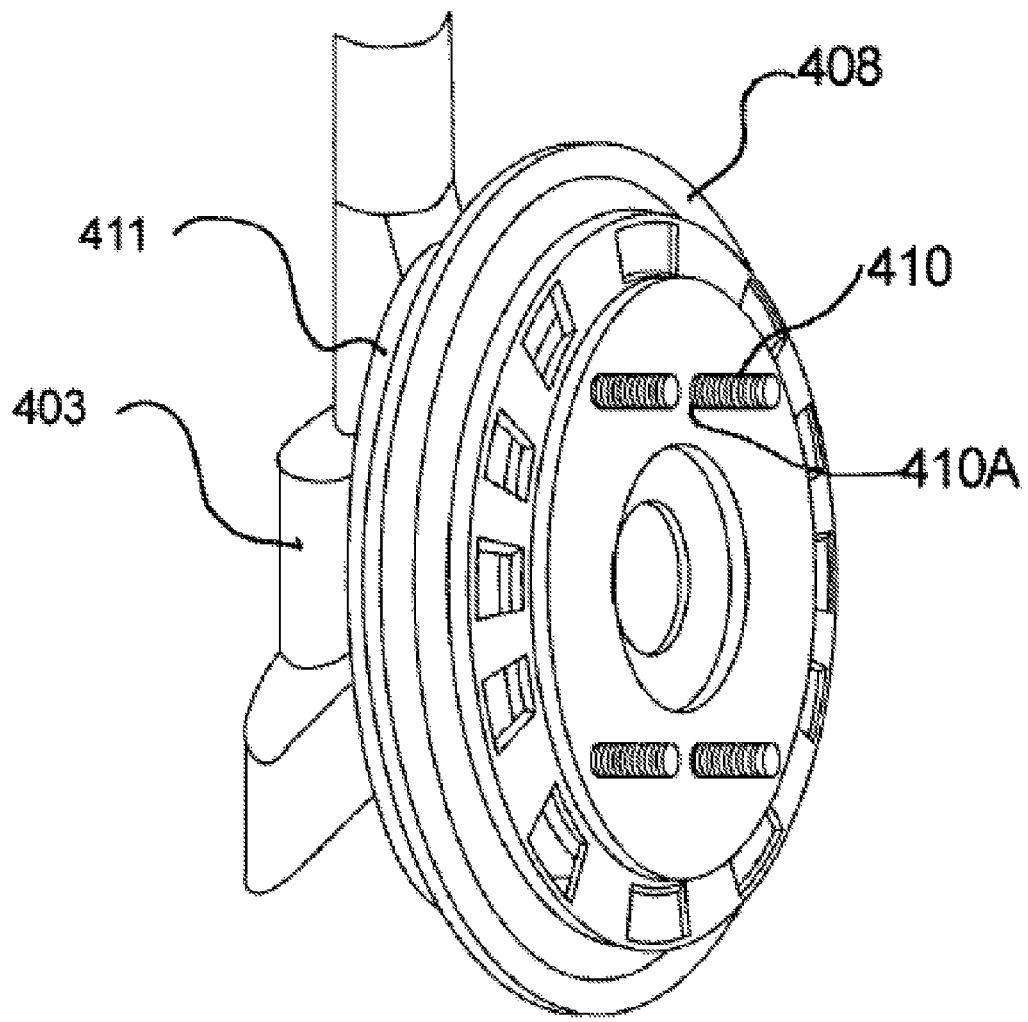
FIG. 25 is an assembled ¾ view of a control-arm spindle, brake drum and slip-on rotor.

FIG. 25 shows the rotor (408) fully seated on the drum (411) rotatable element (415) with the studs (410) slid through the holes (410A), and ready to be secured.

Figure 26:
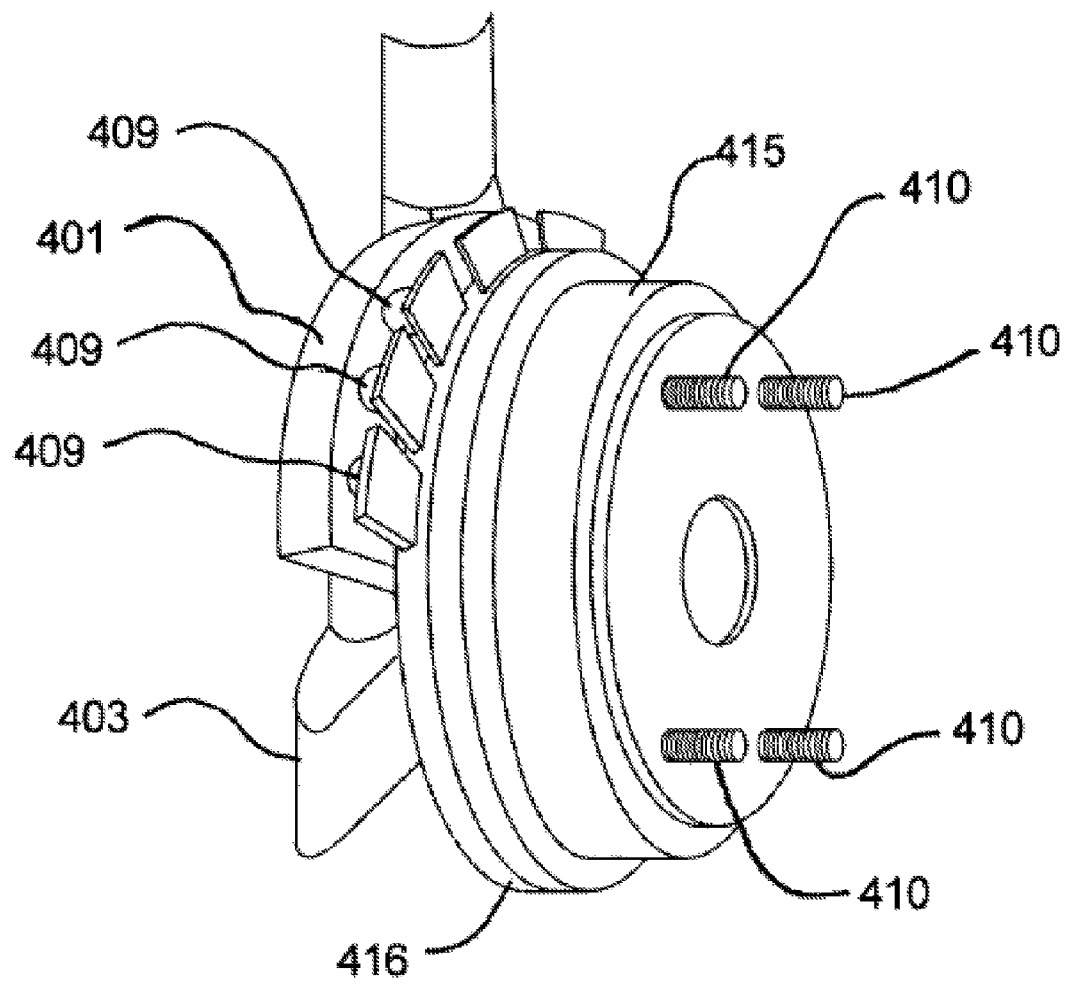
FIG. 26 is an assembled ¾ view of a control-arm spindle, stator, and drum.
Figure 27:
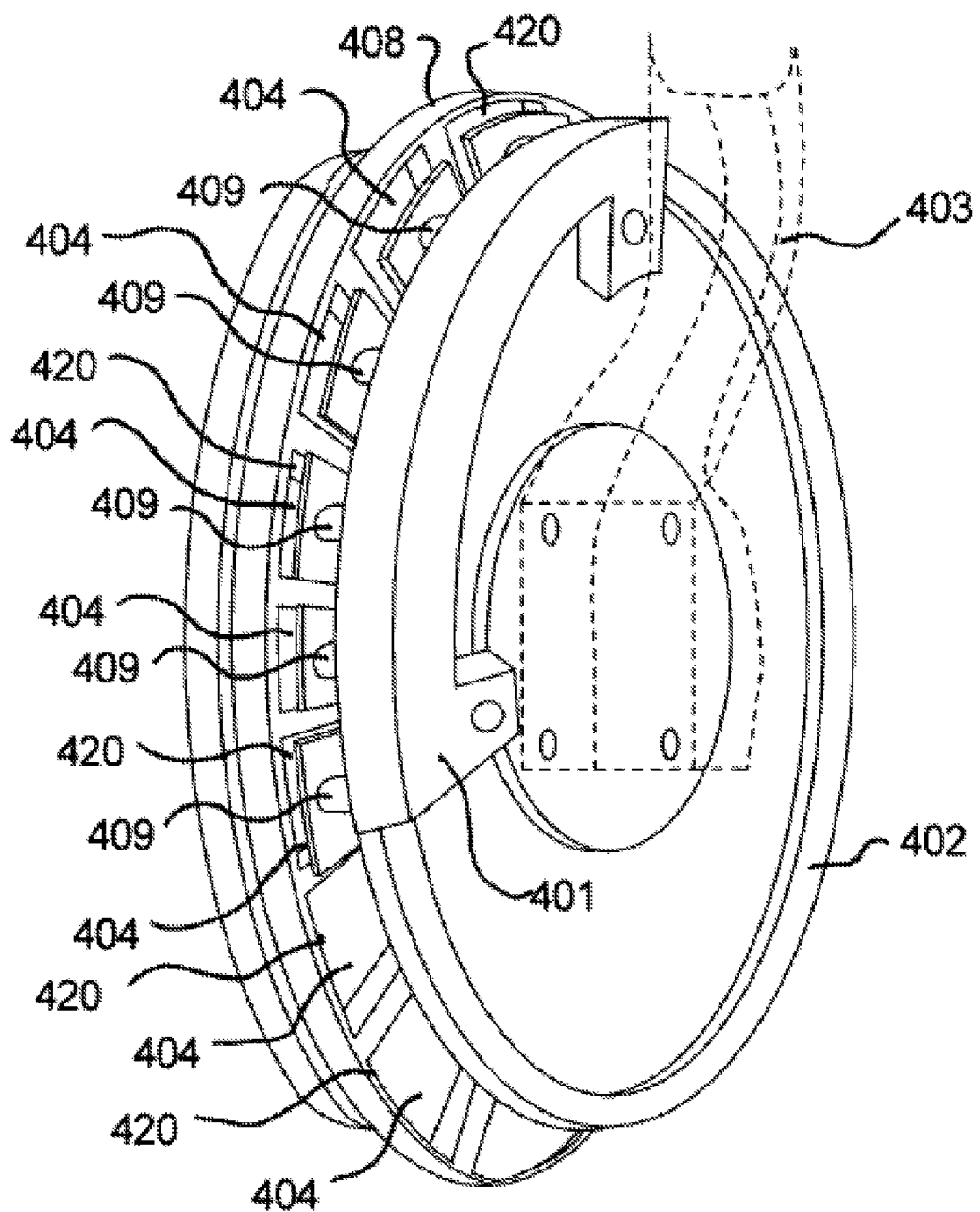
FIG. 27 is an assembled ¾ view of a control-arm spindle, brake drum, slip-on rotor, and stator.

Referring to FIGS. 26 and 27, we see that the rotor has magnets (404) mounted on the side of the rotor (408) face nearest the spindle arm (403). The rotor (408), is manufactured of preferably light-weight, and non-ferrous substance. Aircraft-grade aluminum or high-density polycarbonate are examples of appropriate materials for the rotor (408).

The magnets (404) used for the purpose of illustration, are of a permanently magnetic variety. As in FIG. 30, the rotor may have an additional ring (412) by which magnetic flux from the magnets (404) is transmitted from portion to portion. This ring (412) is comprised of a ferromagnetic substance in sufficient proportion to carry the necessary flux around the circumference of the rotor (408).

Figure 28:
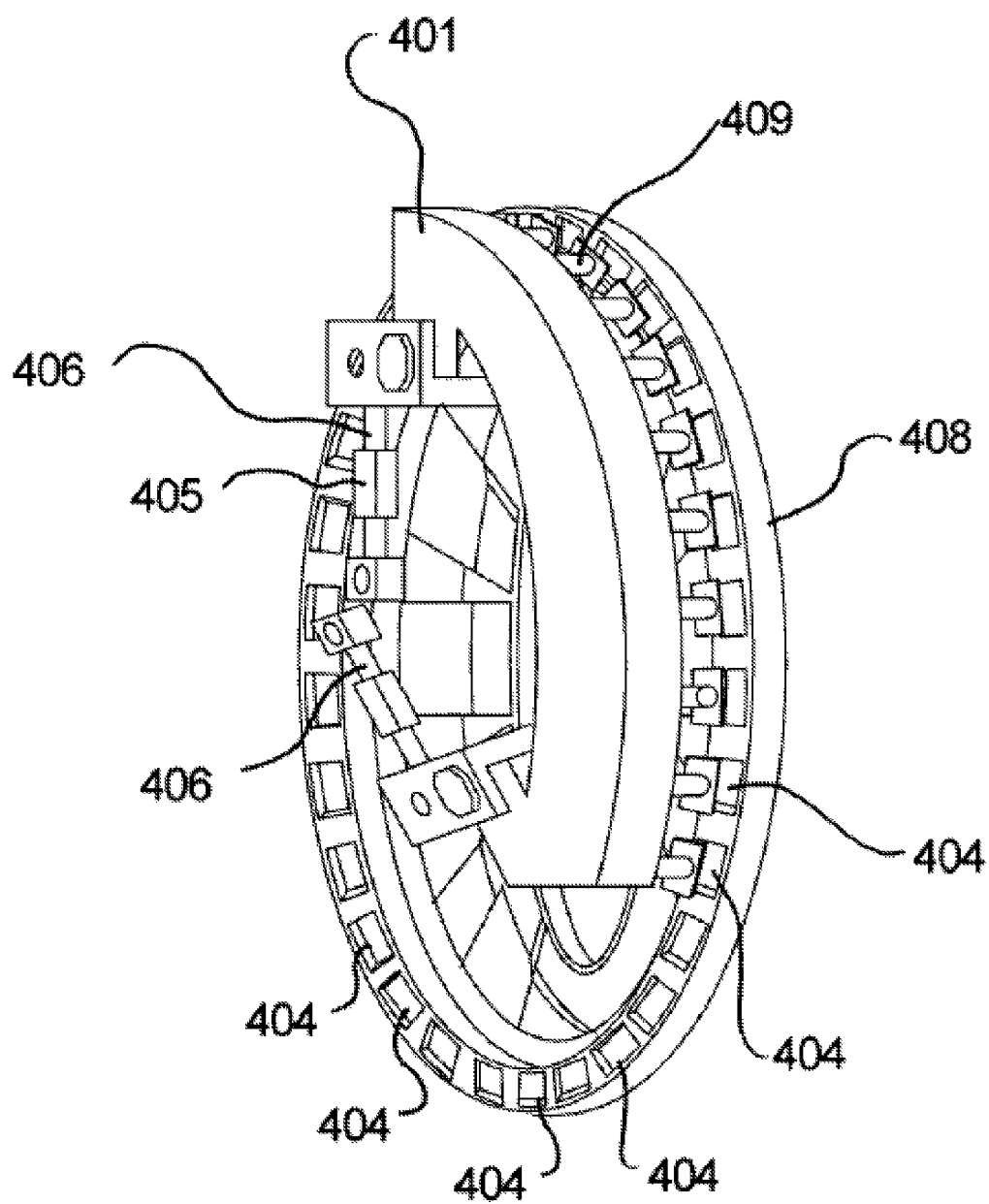
FIG. 28 is an assembled ¾ view of a rotor and stator with mounting hardware.
Figure 29:
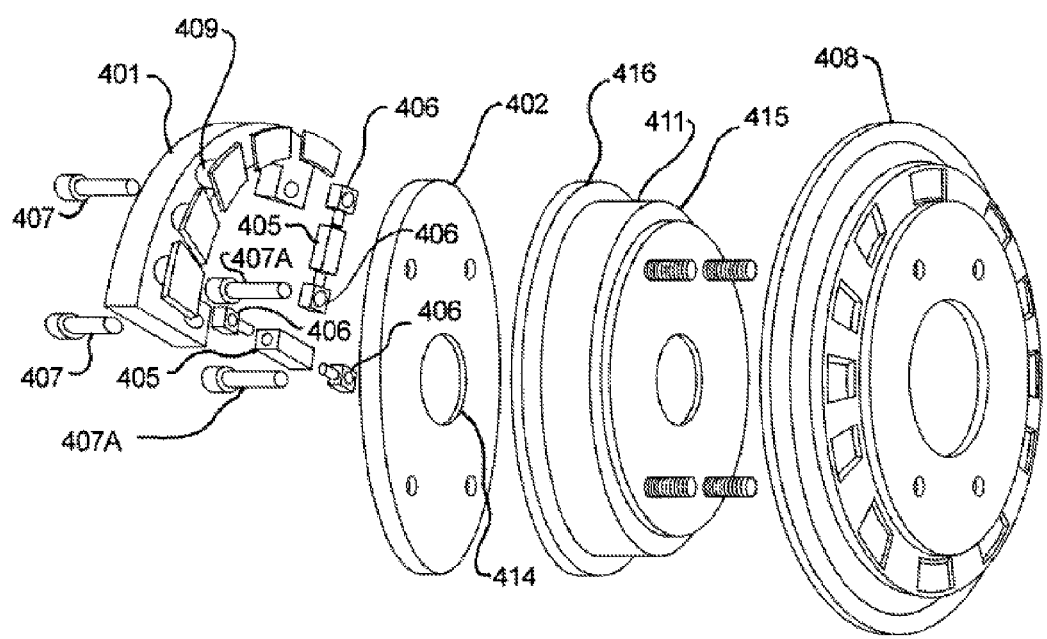
FIG. 29 is an exploded ¾ view of a stator, backing-plate, brake drum, and slip-on rotor.

FIG. 26 through 30 show views and forms of the stator (401). The stator (401) is mounted on the back side of the backing-plate (402) of the drum (411), said backing plate (402) attached to the stationary element (416). The stator (401) may be bolted directly thereto as shown in FIG. 18, FIG. 26, and FIG. 28. Alternatively, FIGS. 28 and 29 show that the stator (401) may be attached to the drum (411) stationary element (416) or backing-plate (402) thereof by means of mounting components comprising an adjusting sleeve (405) having a threaded bore (405A), mounting-head-bolts (406) having heads (406A) and threads (406B), the heads (406A) having threaded bores (406C), gap-adjusting-bolts (407) and connective bolts (407A).

Figure 31C:
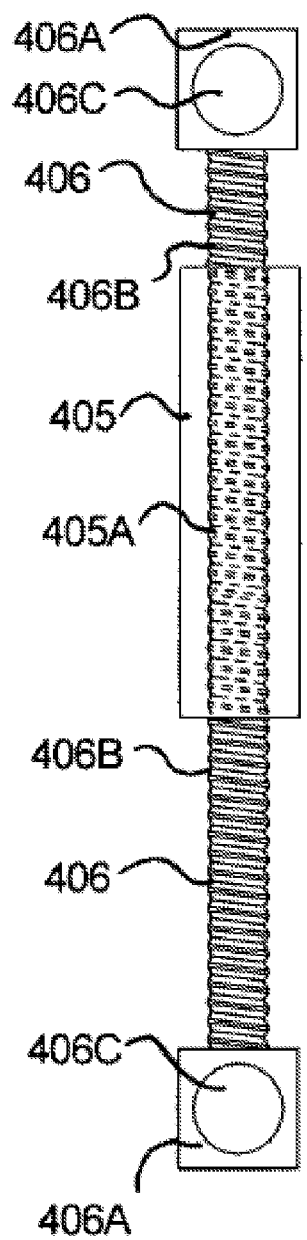
FIG. 31C is a side view of mounting hardware in communication.
Figure 31D:
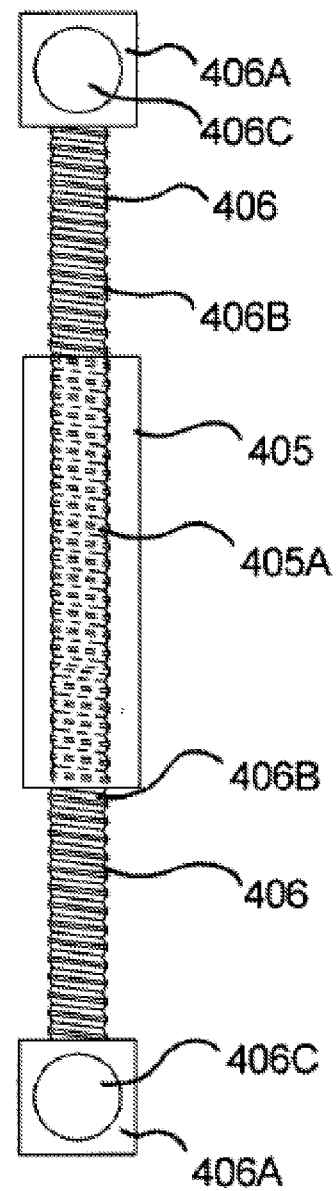
FIG. 31D is a side view of mounting hardware in communication.

FIG. 31A and FIG. 31B show the adjusting sleeve (405) and mounting-head-bolts (406). FIG. 31C and FIG. 31D show that the mounting-head-bolts (406), by means of threads (406B), communicate with opposite ends of the adjusting sleeve threaded bore (405A) so that the mounting-head-bolts (406) may be advanced into or withdrawn from the adjusting sleeve (405). Thusly, the distance between the mounting-head-bolt heads (406A) may be varied.

Figure 32:
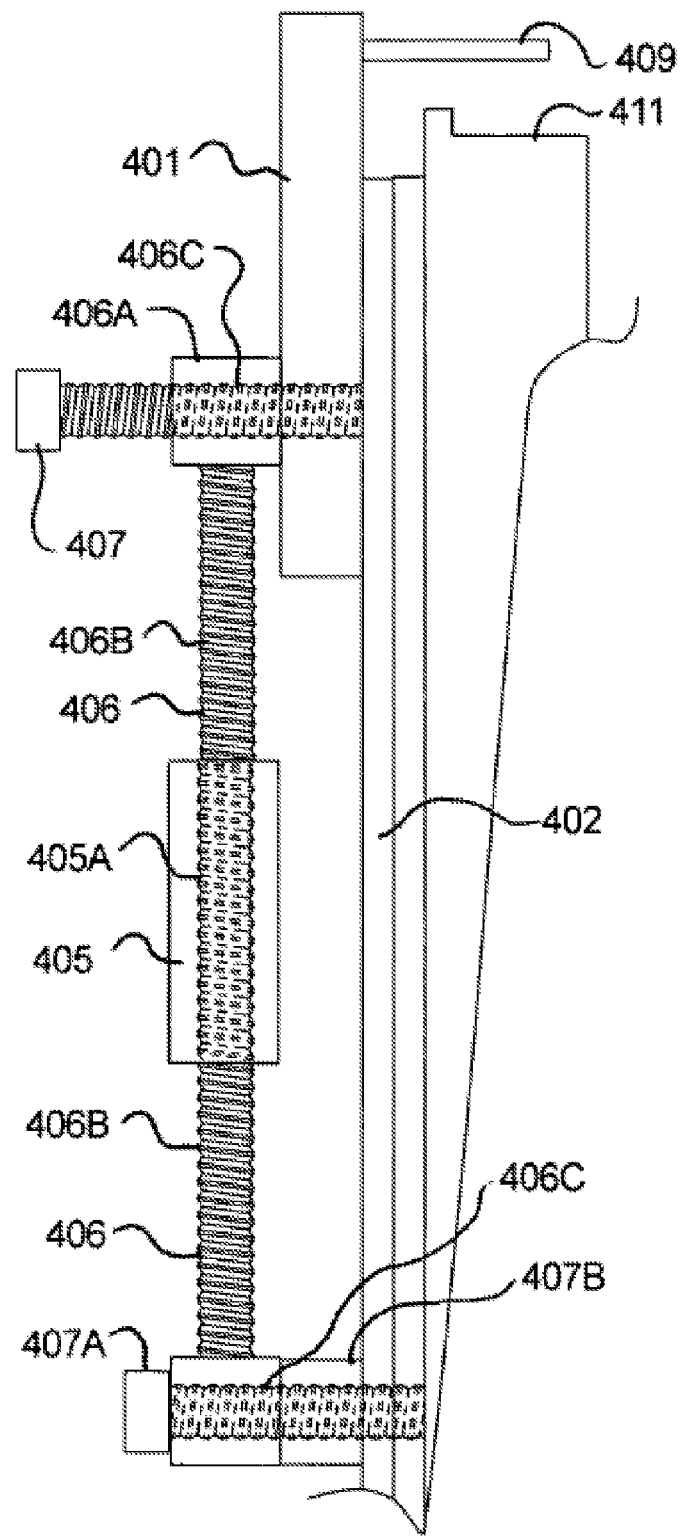
FIG. 32 is a side view of mounting hardware in operative configuration.
Figure 33:
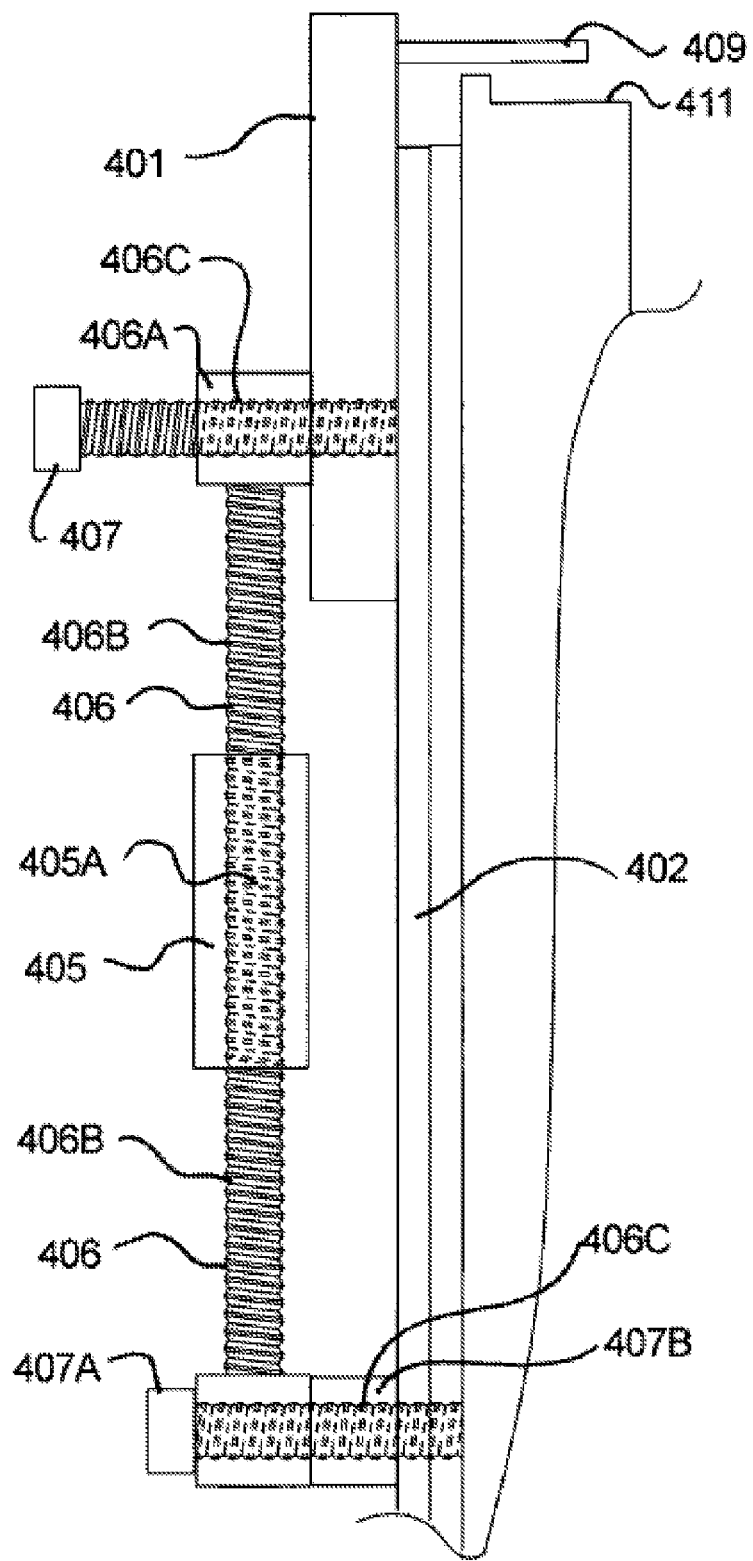
FIG. 33 is a side view of mounting hardware in operative configuration.

FIG. 32 and FIG. 33 show a stator (401), having stator pole (409), fixedly attached to the mounting-head-bolt head (406A) by gap-adjusting-bolt (407) being extended through the head threaded bore (406C) and into the stator (401). Also shown are adjusting sleeves (405) having mounting-head-bolts (406) communicating with the threaded bore (405A) at opposite ends thereof. Further, the mounting-head-bolt head (406A) opposite the head (406A) attached to the stator (401) is shown attached to the backing-plate (402) by means of connective bolt (407A) passing there-through and into the backing-plate (402). Further, if the backing-plate (402) is irregular and/or it is desirable to create additional clearance between the mounting components and the backing plate (402), a shim or washer (407B) may be disposed between the mounting-head-bolt head (406A) and the backing-plate (402).

Now, comparing FIG. 32 to FIG. 33, one may understand that by varying the distance between the opposite mounting-head-bolt heads (406A), as previously described regarding FIGS. 31C and 31D, the distance of the stator pole (409) and the drum (411) may be varied in a plane essentially normal to the drum (411).

Figure 34A:
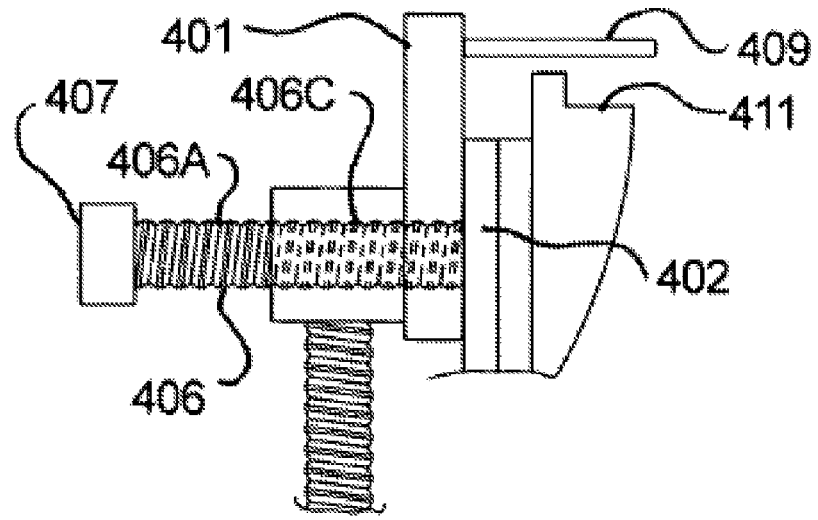
FIG. 34A is a side view of mounting hardware in operative configuration.
Figure 34B:
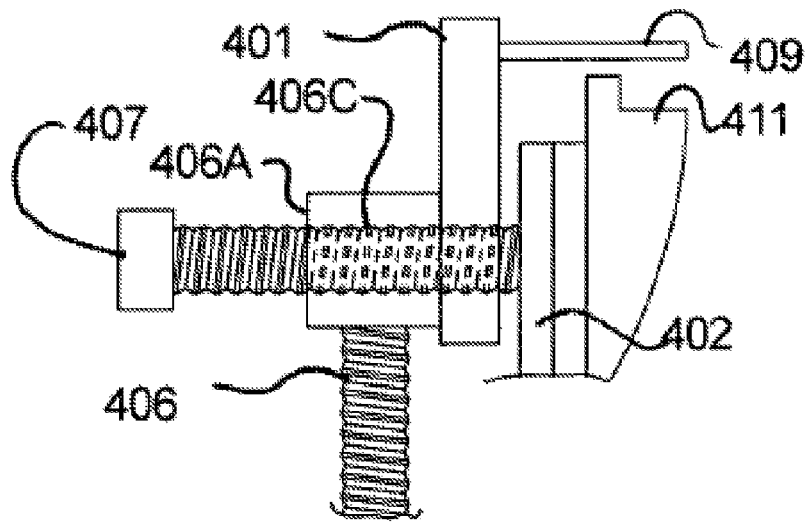
FIG. 34B is a side view of mounting hardware in operative configuration.

FIG. 34A and FIG. 34B, and comparison therebetween, show that by extending the gap-adjusting-bolt (407) through the mounting-head-bolt head (406) and the stator (401), the stator (401) may be forced away from the backing-plate (402) thusly moving the stator pole (409) relative the drum (411) essentially in a plane essentially parallel to the drum (411).

Thus, this configuration of mounting components allow the position of the stator (401) to be adjusted as to its mounting position on the backing-plate (402) so as to vary the alignment of the of the teeth-like stator-poles (409), which are fixed, with the corresponding rotor magnets (404) which may be stopped, or may be in motion. The gap-adjusting-bolts (407) permit the plane in which the stator (401) lies to be adjusted, also. The stator-poles (409) are aligned along the center line axis and in parallel with the rotor magnets (404) so that each stator pole is the same size and geometry as each rotor magnet. This configuration allows for the most efficient operation of the wheel hub motor.

Given that this stator (401) and rotor (408) comprise components of a D.C. brushless motor, by properly controlling activation of the electromagnetic poles of the stator (409), relative to the rotation and position of the rotor magnets (404), rotary motion of the rotor (408) may be induced or constrained. Thus, they may be used to drive a wheel, or to induce braking.

FIG. 29 shows the mounting hardware (405), (406), gap-adjusting-bolts, (407), connective bolts (407A) and stator (401) with the rotor (408) as reference. The stator-poles (409) and rotor magnets (404) are aligned to correspond with the desired rotor (408) rotation timing or synchronization. The mounting hardware, (405), (406), connective bolts (407A) and gap-adjusting bolts (407), are made from high-grade alloy, and configured so as to be adapted and installed on virtually any standard automobile.

Figure 30:
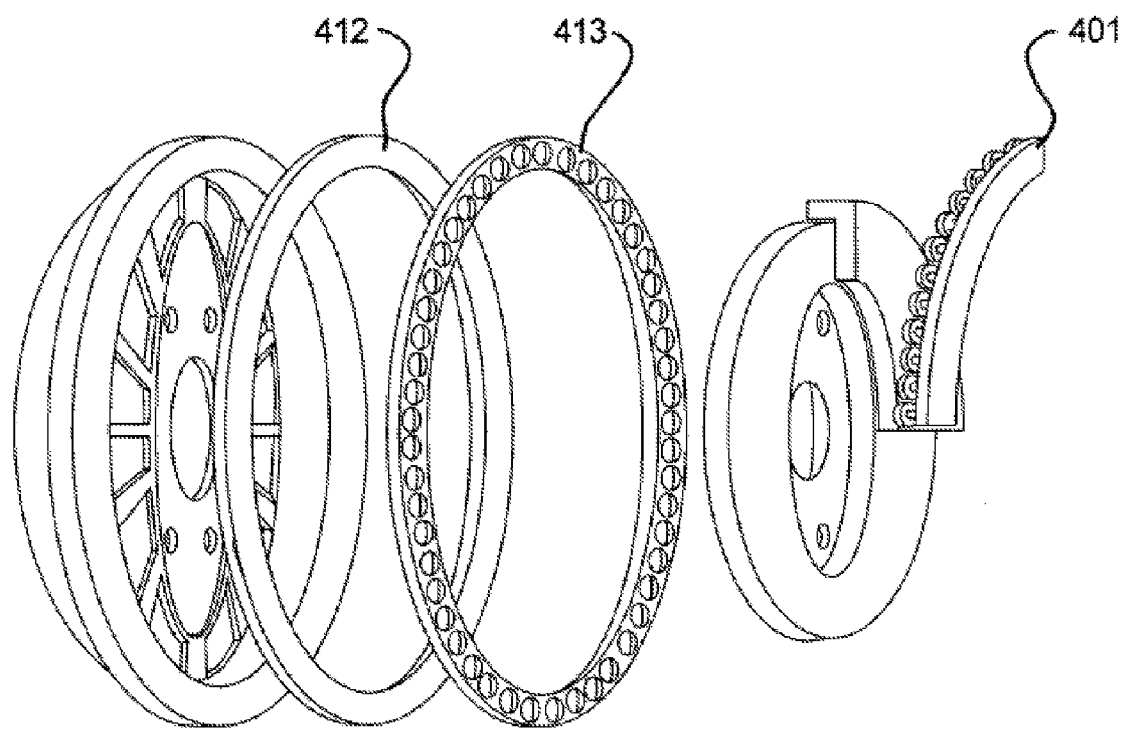
FIG. 30 is an exploded ¾, back view of a slip-on rotor, magnetic flux ring, magnet-holding ring, brake-drum, caliper, and stator.

The drawing of FIG. 30, which also includes an un-modified brake, depicts an alternative detailed design of the rotor (408), in which the rotor (408) is comprised of a magnetic-flux-ferromagnetic-ring (412) that connects the rotor magnets (404), thus forming a magnetic circuit typical in motor design. In addition, a magnet-holding ring (412), similar in function to the permanent magnet pocket (420) holding permanent magnets (404), is shown in FIG. 27. These differ from the permanent magnets (404) and stator-poles (409) of FIG. 30 in that those depicted in FIG. 30 are round instead of rectangular. The stator-poles (409) are arranged in conjunction with the rotor assembly (408), (412), (413), (404), and (304), thus forming a DC disk/rotor (308) and brake caliper (313).

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims. It should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A device for installation on a motor vehicle wheel-assembly comprising a wheel hub with a plurality of stud-bolts, said device comprising:
   a rotor with a base and a plurality of rotor magnets positioned along or extending from the base;
   a stator affixed to the wheel-assembly, said stator comprising a stator plate, a stator ring affixed to the periphery of the stator plate, and a plurality of stator magnets positioned along the stator ring, wherein the plurality of stator magnets are electromagnets and in close proximity to the rotor magnets;
   wherein said rotor is attached to said wheel hub by means of the stud bolts and without modification of the wheel hub.

2. The device of claim 1, wherein the rotor rotates with rotation of the wheel hub.

3. The device of claim 1, wherein the interaction of the moving rotor magnets with the stationary stator magnets generates electric power.

4. The device of claim 1, wherein the interaction of the moving rotor magnets with the stationary stator magnets functions as an electric motor.

5. The device of claim 4, further comprising an electronic control device to activate and regulate the interaction of the magnets.

6. The device of claim 5, wherein each stator electromagnet has, when activated at a given moment, a north pole and a south pole, and, wherein the said one or more stator electromagnets are configured in the shape the letter C in such a way as to dispose the north and south poles of any given stator electromagnet proximal to its opposite pole on the same magnet, so configured that as the rotor rotates, relative to the stator, the said magnets of said rotor pass between both the north and south poles of each said stator electromagnet.

7. The device of claim 5, wherein rotary motion of the rotor may be induced or constrained by controlling the sequencing of activation of the electromagnetic stator-poles of the stator.

8. The device of claim 1, wherein the plurality of rotor magnets are positioned on the end of arms extending from the base at an angle.

9. The device of claim 1, wherein the plurality of rotor magnets are positioned on the end of arms extending orthogonally from the base.

10. A method for conversion of an internal-combustion motor vehicle to a hybrid electrical propulsion vehicle, comprising:
- installing a rotor with a base and a plurality of rotor magnets positioned along or extending from said rotor, on a wheel hub in a first wheel-assembly on said motor vehicle, wherein said rotor is installed without modification of the wheel hub; and
- installing a stator in said first wheel-assembly, wherein said stator comprises a plurality of stator magnets;
- wherein the plurality of stator magnets are in close proximity to the rotor magnets.

11. The method of claim 10, wherein said rotor is attached to said wheel hub by means of a plurality of stud-bolts on said wheel hub.

12. The method of claim 10, wherein said stator is a rigidly attached to a hub plate in said first wheel-assembly.

13. The method of claim 10, wherein the steps of installing a rotor and installing a stator are repeated on at least a second wheel-assembly on said motor vehicle.

14. The method of claim 10, wherein the steps of installing a rotor and installing a stator are repeated on all wheel-assemblies on said motor vehicle.

* * * * *